United States Patent
Inoue et al.

(12)

(10) Patent No.: US 8,865,373 B2
(45) Date of Patent: Oct. 21, 2014

(54) CELL FOR SOLID OXIDE FUEL CELL

(75) Inventors: Shuichi Inoue, Osaka (JP); Hidemasa Nonaka, Osaka (JP); Satoru Uenoyama, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 327 days.

(21) Appl. No.: 12/989,103

(22) PCT Filed: Apr. 23, 2009

(86) PCT No.: PCT/JP2009/058079
§ 371 (c)(1),
(2), (4) Date: Dec. 27, 2010

(87) PCT Pub. No.: WO2009/131180
PCT Pub. Date: Oct. 29, 2009

(65) Prior Publication Data
US 2011/0287341 A1    Nov. 24, 2011

(30) Foreign Application Priority Data

Apr. 24, 2008  (JP) .................................. 2008-114315
Jul. 29, 2008  (JP) .................................. 2008-195189
Oct. 16, 2008  (JP) .................................. 2008-267607

(51) Int. Cl.
*H01M 4/86*   (2006.01)
*H01M 8/12*   (2006.01)
*H01M 4/90*   (2006.01)
*H01M 8/02*   (2006.01)

(52) U.S. Cl.
CPC .......... *H01M 8/1206* (2013.01); *H01M 4/9033* (2013.01); *Y02E 60/521* (2013.01); *H01M 8/0297* (2013.01); *Y02E 60/525* (2013.01); *H01M 8/0217* (2013.01); *H01M 8/0228* (2013.01)

USPC ....................................................... 429/532

(58) Field of Classification Search
USPC ....................................................... 429/532
See application file for complete search history.

(56) References Cited

U.S. PATENT DOCUMENTS 5,942,349 A    8/1999   Badwal et al.
(Continued)

FOREIGN PATENT DOCUMENTS

DE           102005015755       10/2006
(Continued)

OTHER PUBLICATIONS

Wu, et al., "Evaluation of SmCo and SmCoN magnetron sputtering coatings for SOFC interconnect applications", Journal of Power Sources, Elsevier, vol. 175, No. 2, 833-840.*

(Continued)

*Primary Examiner* — Karie O'Neill Apicella
(74) *Attorney, Agent, or Firm* — The Webb Law Firm

(57) ABSTRACT

[OBJECT] In an SOFC cell comprising a Cr-containing alloy or the like and an air electrode bonded together, the invention is to provide a cell capable of effectively restricting occurrence of Cr poisoning of the air electrode and capable also of effectively restricting occurrence of oxidation deterioration due to Cr depletion in the alloy or the like.

[SOLUTION] In a cell for a solid oxide fuel cell (SOFC) comprising a Cr (chrome)-containing alloy or oxide and an air electrode bonded together, wherein on the surface of the alloy or oxide, there is formed a coating layer containing a spinel oxide comprised of a first mono metal oxide and a second mono metal oxide, the first mono metal oxide having an equilibrium dissociated oxygen partial pressure at 750° C. ranging from $1.83 \times 10^{-20}$ to $3.44 \times 10^{-13}$ atm., the second mono metal oxide having a lower equilibrium dissociated oxygen partial pressure at 750° C. than the first mono metal oxide.

4 Claims, 22 Drawing Sheets

(56) References Cited

U.S. PATENT DOCUMENTS

| | | | |
|---|---|---|---|
| 7,407,717 | B2 | 8/2008 | Tietz et al. |
| 2004/0056754 | A1* | 3/2004 | Tseung et al. .................. 338/34 |
| 2006/0099442 | A1 | 5/2006 | Tietz et al. |
| 2007/0122304 | A1 | 5/2007 | Ramasesha et al. |
| 2010/0178587 | A1 | 7/2010 | Inoue et al. |

FOREIGN PATENT DOCUMENTS

| | | | |
|---|---|---|---|
| JP | 57202089 | A * | 12/1982 |
| JP | 11501764 | A | 2/1999 |
| JP | 2001196077 | A | 7/2001 |
| JP | 2004259643 | A | 9/2004 |
| JP | 200632183 | A | 2/2006 |
| JP | 200716297 | A | 1/2007 |
| JP | 2007162132 | A | 6/2007 |
| WO | 2007083627 | A1 | 7/2007 |

OTHER PUBLICATIONS

Ling, et al., "Electrical Conductivity and Thermal Expansion of Spinels at Elevated Temperatures", Journal of the American Ceramic Society, Blackwell Publishing, Malden, MA, US, vol. 90, No. 5, 2007, 1515-1520.*

Wu, et al.; "Evaluation of SmCo and SmCoN magnetron sputtering coatings for SOFC interconnect applications", Journal of Power Sources, Elsevier SA, CH, vol. 175, No. 2, Dec. 6, 2007.

Petric, et al.; "Electrical Conductivity and Thermal Expansion of Spinels at Elevated Temperatures", Journal of the American Ceramic Society, Blackwell Publishing, Malden, MA, US, vol. 90, No. 5, May 1, 2007.

Ling, et al.; "Electrical and Thermal Properties of Spinels", Solid Oxide Fuel Cells IX (SOFC-IX): Proceedings of the International Symposium; [Papers Presented at the Ninth International Symposium on Solid Oxide Fuel Cells, Held in Quebec City, Canada, May 15-20, 2005], Electrochemical Society, Pennington vol. Jul. 2005, May 20, 2005.

* cited by examiner

EXAMPLE 1

COMPARISON EXAMPLE 1

EXAMPLE 2-1

EXAMPLE 2-2

EXAMPLE 2-3

EXAMPLE 3-1

Fig. 9
EXAMPLE 3-2
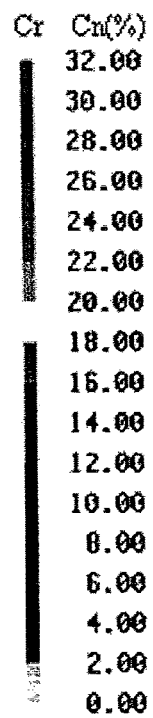
Fig. 10
EXAMPLE 4
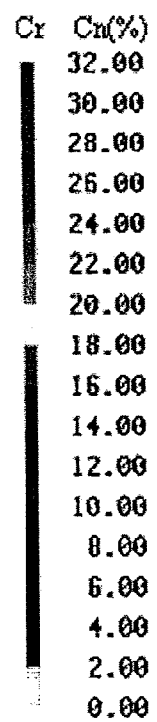

EXAMPLE 6-2

EXAMPLE 7-1

EXAMPLE 7-2

EXAMPLE 8

Fig.17
EXAMPLE 9
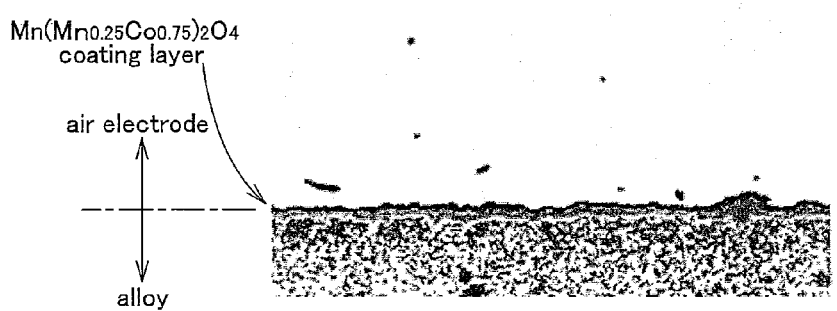
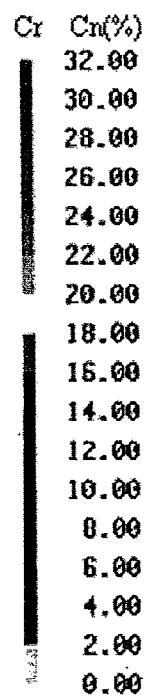
Fig.18
EXAMPLE 10
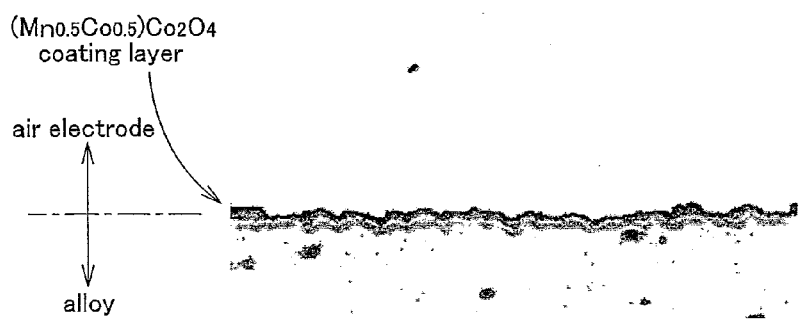
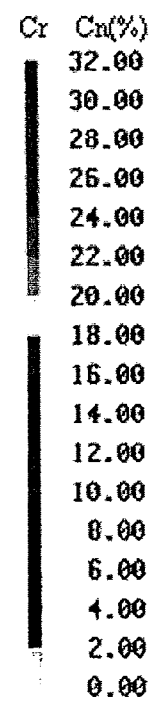

EXAMPLE 11

EXAMPLE 12

Fig.21
EXAMPLE 13
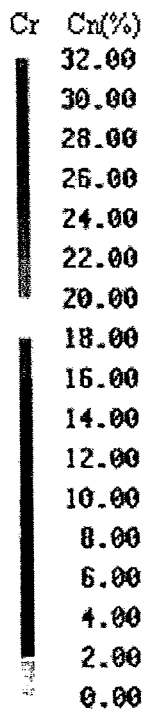
Fig.22
EXAMPLE 14
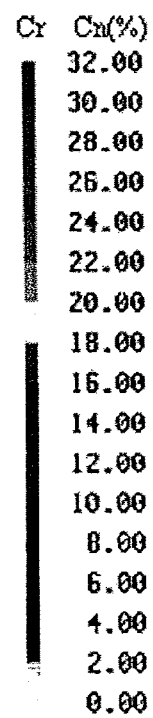

EXAMPLE 15

EXAMPLE 16-1

EXAMPLE 16-2

EXAMPLE 16-3

EXAMPLE 17

EXAMPLE 18

EXAMPLE 19

EXAMPLE 20

EXAMPLE 21

COMPARISON EXAMPLE 2

COMPARISON EXAMPLE 3

Fig.34

| EXAMPLE | drawing number | coating layer | equilibrium dissociated oxygen partial pressure at 750°C(atm) | Cr poisoning restricting effect | voltage drop at 750°C(mV) | coating method | dielectric constant of sintered product at 750°C(S/cm) |
|---|---|---|---|---|---|---|---|
| 1 | 3 | $NiCo_2O_4$ | $3.44 \times 10^{-13}$ | ◎ | 13.1 | double-side dipping | 2.06 |
| 2-1 | 5 | $ZnCo_2O_4$ | $3.44 \times 10^{-13}$ | ◎ | 13.2 | double-side dipping | 0.36 |
| 2-2 | 6 | $ZnCo_2O_4$ | $3.44 \times 10^{-13}$ | ◎ | 10.7 | double-side dipping | 0.36 |
| 2-3 | 7 | $Zn_{0.45}Co_{0.55}Co_2O_4$ | $3.44 \times 10^{-13}$ | ◎ | 10.8 | double-side dipping | 1.04 |
| 3-1 | 8 | $FeMn_2O_4$ | $1.31 \times 10^{-19}$ | ◎ | 37.8 | one side sputtering(2μm) | undermined |
| 3-2 | 9 | $FeMn_2O_4$ | $1.31 \times 10^{-19}$ | ◎ | 25.9 | double-side dipping | 0.62 |
| 4 | 10 | $NiMn_2O_4$ | $2.72 \times 10^{-16}$ | ◎ | 19.4 | double-side dipping | 4.32 |
| 5 | 11 | $CoMn_2O_4$ | $2.90 \times 10^{-17}$ | ◎ | 17.9 | double-side dipping | 0.81 |
| 6-1 | 12 | $MnFe_2O_4$ | $1.31 \times 10^{-19}$ | ◎ | 36.1 | one side sputtering(2μm) | undermined |
| 6-2 | 13 | $MnFe_2O_4$ | $1.31 \times 10^{-19}$ | ◎ | 15.9 | double-side dipping | 0.11 |
| 7-1 | 14 | $MnNi_2O_4$ | $2.72 \times 10^{-16}$ | ◎ | 39.4 | one side sputtering(2μm) | undermined |
| 7-2 | 15 | $MnNi_2O_4$ | $2.72 \times 10^{-16}$ | ◎ | 20.2 | double-side dipping | 5.47 |
| 8 | 16 | $MnCo_2O_4$ | $3.44 \times 10^{-13}$ | ◎ | 15.6 | double-side dipping | 10.1 |
| 9 | 17 | $Mn(Mn_{0.25}Co_{0.75})_2O_4$ | $3.44 \times 10^{-13}$ | ◎ | 24.3 | double-side dipping | 35.6 |
| 10 | 18 | $(Mn_{0.5}Co_{0.5})Co_2O_4$ | $3.44 \times 10^{-13}$ | ◎ | 18.6 | double-side dipping | 4.2 |
| 11 | 19 | $TiCo_2O_4$ | $2.90 \times 10^{-17}$ | ○ | 63.8 | double-side dipping | 0.17 |
| 12 | 20 | $ZnFe_2O_4$ | $1.31 \times 10^{-19}$ | ◎ | 34.2 | double-side dipping | 0.21 |
| 13 | 21 | $FeCo_2O_4$ | $3.44 \times 10^{-13}$ | ◎ | 13.8 | double-side dipping | 2.36 |
| 14 | 22 | $CoFe_2O_4$ | $3.44 \times 10^{-13}$ | ◎ | 25.2 | double-side dipping | 0.21 |
| 15 | 23 | $MgCo_2O_4$ | $3.44 \times 10^{-13}$ | ◎ | 18.5 | double-side dipping | 0.46 |
| 16-1 | 24 | $Co_3O_4$ | $3.44 \times 10^{-13}$ | ◎ | 13.3 | double-side dipping | 3.93 |
| 16-2 | 25 | $Co_3O_4$ | $3.44 \times 10^{-13}$ | ◎ | 15.6 | electroless plating | 3.93 |
| 16-3 | 26 | $Co_3O_4$ | $3.44 \times 10^{-13}$ | ◎ | 23.1 | electroplating | 3.93 |
| COMPARSION EXAMPLE | 4 | no coating layer | - | × | 12.5 | - | - |

CELL FOR SOLID OXIDE FUEL CELL

TECHNICAL FIELD

The present invention relates to a cell for a solid oxide fuel cell (to be referred to as "SOFC" when appropriate hereinafter) formed by a Cr (chrome)-containing alloy or oxide (may be referred generically to as "alloy or the like" hereinafter) and an air electrode bonded together.

BACKGROUND ART

Such cell for SOFC has a structure wherein a unit cell is formed by bonding an air electrode to one face of an electrolyte layer and bonding a fuel electrode to the other face of this electrolyte layer, and this unit cell is clamped between a pair of electron-conductive alloys or the like which give/receive electrons to/from the air electrode or the fuel electrode.

And, such SOFC cell is operable at an operating temperature e.g. from 700 to 900° C. approximately, so that in association with ion migration from the air electrode to the fuel electrode via the electrolyte layer, an electromotive force is generated between the pair of electrodes and this electromotive force can be taken out of the cell for its utilization.

The alloy employed in such SOFC cell is made from a Cr-containing material having good electron conductivity and oxidation resistance. And, such heat resistance of the alloy is attributable to a dense coating layer of chromia ($Cr_2O_3$) formed on the surface of this alloy.

Further, with the SOFC cell, during its manufacturing process, for such purpose as minimizing the contact resistance between the alloy and the air electrode or the fuel electrode, there is sometimes conducted a sintering treatment effected at a sintering temperature ranging from 1000 to 1250° C. approximately, which is higher than the operating temperature (see. e.g. Patent Document 1).

On the other hand, there is also a technique attempting to restrict oxidation of Cr contained in the alloy into a hexavalent oxide which can easily scatter about, by subjecting the surface of the alloy employed in SOFC cell to a coating layer forming treatment which forms on the alloy surface an n-type semiconductor coating layer obtained by doping a mono metal oxide) with an impurity (see, e.g. Patent Document 2).

PRIOR ART DOCUMENTS

Patent Documents

Patent Document 1: JP-A-2004-259643
Patent Document 2: WO 2007/083627

SUMMARY OF THE INVENTION

Object to be Accomplished by Invention

With the above-described SOFC cell comprising a Cr-containing alloy and an air electrode bonded together, when the cell is exposed to a high temperature, Cr contained in the alloy tends to scatter about toward the air electrode, thus causing Cr poisoning this air electrode.

Such Cr poisoning of air electrode disturbs the oxygen reduction at the air electrode. The disturbance leads to increase in the electric resistance and leads also to reduction in the Cr concentration of the alloy or the like. As a result, there occurs such problem as deterioration in the oxidation resistance of the alloy or the like per se and eventually deterioration in the performance of SOFC.

Further, during the manufacturing of the SOFC too, if a sintering treatment is effected under the condition of the alloy or the like being bonded to the air electrode, as is the case with Patent Document 1, due to the exposure to the sintering temperature which is higher than the operating temperature, oxide of Cr (VI) will be produced, which will then evaporate to react with the air electrode, thus causing Cr poisoning of the air electrode. Further, during this sintering treatment, an arrangement may be made for restricting occurrence of the above-described Cr poisoning during the manufacturing, by restricting such oxidation of the chromia ($Cr_2O_3$) present on the surface of alloy to Cr (VI) or oxidation of oxide of Cr (III) present on the alloy surface to Cr (VI) through minimization of the oxygen partial pressure in vacuum or inactive gas atmosphere. However, even in this case, as a result of subsequent exposure to a high temperature in an oxidizing atmosphere where the air to be supplied to the air electrode is present, oxidation to Cr (VI) may be promoted, whereby the above-described Cr poisoning may occur.

On the other hand, it has been also conceived to form a coating layer of a mono metal oxide on the surface of the alloy or the like in order to restrict occurrence of the oxidation of the Cr (III) oxide to Cr (VI). However, mono metal oxides which have low oxidizing power (small equilibrium dissociated oxygen partial pressure) generally have high electric resistance. Therefore, in practice, it is necessary to improve the conductivity by rendering them into semiconductors (that is, doping with impurity for instance), as is the case with Patent Document 2. In this case, the number of manufacturing steps of the SOFC cell will increase, which may be a cause for cost increase. On the other hand, many of mono metal oxides which have high oxidizing power (high equilibrium dissociated oxygen partial pressure) have low electric resistance. However, these oxides cannot effectively restrict occurrence of oxidation of the Cr (III) oxide to Cr (VI). Accordingly, there is still a need for a different solution.

The present invention has been made with view to the above-described need. The object of the invention is to provide an SOFC cell comprising a Cr-containing alloy or the like and an air electrode bonded together, the inventive cell being capable of effectively restricting occurrence of Cr poisoning of the air electrode and capable also of effectively restricting occurrence of oxidation deterioration due to Cr depletion in the alloy or the like.

Means for Accomplishing Object

According to the characterizing feature of the present invention, there is provided a cell for a solid oxide fuel cell (SOFC) comprising a Cr (chrome)-containing alloy or oxide and an air electrode bonded together, wherein on the surface of said alloy or oxide, there is formed a coating layer containing a spinel oxide comprised of a first mono metal oxide and a second mono metal oxide, said first mono metal oxide having an equilibrium dissociated oxygen partial pressure at 750° C. ranging from $1.83 \times 10^{-20}$ to $3.44 \times 10^{-13}$ atm., said second mono metal oxide having a lower equilibrium dissociated oxygen partial pressure at 750° C. than said first mono metal oxide.

As described hereinbefore, for a solid oxide fuel cell (SOFC), there is a need for preventing Cr poisoning of the air electrode due to scattering about of Cr from the side of the alloy or oxide ("alloy or the like"). And, there is also a need for preventing or restricting occurrence of oxidation deterioration due to decrease of Cr (Cr depletion) in the alloy or the like.

In this respect, on the surface of the alloy or the like, there is formed a coating layer containing a spinel oxide comprised of a first mono metal oxide and a second mono metal oxide, the first mono metal oxide having an equilibrium dissociated oxygen partial pressure at 750° C. ranging from $1.83 \times 10^{20}$ to $3.44 \times 10^{13}$ atm., the second mono metal oxide having a lower equilibrium dissociated oxygen partial pressure at 750° C. than the first mono metal oxide. In the meantime, the language "an equilibrium dissociated oxygen partial pressure" used herein means a value when the mono metal oxide is reduced to the metal. Further, the equilibrium dissociated oxygen partial pressure is a value obtained from the standard free energy of formation of the oxide formed from such elemental substances as a metal and an oxygen (that is, a value calculated from the Ellingham diagram). In this, with the first mono metal oxide, it is difficult for this oxide alone to restrict the oxidation of Cr (III) on the surface of the alloy or the like to Cr (VI). However, when this first mono metal oxide is combined with the second mono metal oxide into a spinel type oxide, this first mono metal oxide can be present in a more stable manner than when it is present by itself. With the spinel oxide, valency change occurs less likely (in other words, its oxidative power is smaller). As a result, it is possible to restrict the oxidation of Cr (III) oxide to Cr (VI). Further, due to its crystalline structure, the spinel oxide has another property of slow diffusion of cation (including oxide of Cr).

The lower limit value of the equilibrium dissociated oxygen partial pressure ($1.83 \times 10^{-20}$ atm) is the equilibrium dissociated oxygen partial pressure at 750° C. of $WO_3$ which is one example of mono metal oxides conventionally employed for forming a coating layer. And, this value is the upper limit value in the case of the conventional technique. Further, the upper limit value of the equilibrium dissociated oxygen partial pressure ($3.44 \times 10^{-13}$ atm) is the upper limit value in the case of using a coating layer containing a spinel oxide according to the present invention.

With the stabilization by rendering mono metal oxides into a spinel oxide, it becomes possible to restrict diffusion of Cr (VI) oxide (or oxyhydroxide) in a gas phase from the side of the alloy or the like to the air electrode side or to the boundary face between the air electrode and the electrolyte, so that occurrence of Cr poisoning of the air electrode can be effectively restricted. Further, as the scattering of Cr from the alloy or the like side can be restricted, occurrence of oxidation deterioration of the alloy or the like due to Cr depletion can be restricted.

Preferably, in the cell for a solid oxide fuel cell relating the present invention, said first mono metal oxide is selected from the group consisting of $Fe_2O_3$, FeO, NiO, COO, $Ni_2O_3$, $Mn_2O_3$ and $Co_2O_3$.

With the cell for a solid oxide fuel cell having the above-described inventive construction, since the above described preferred oxide is employed as the first mono metal oxide which is the oxide having the higher equilibrium dissociated oxygen partial pressure at 750° C. constituting a spinel oxide, it becomes possible to restrict diffusion of Cr (VI) oxide (or oxyhydroxide) in a gas phase from the side of the alloy or the like to the air electrode side or to the boundary face between the air electrode and the electrolyte, so that occurrence of Cr poisoning of the air electrode can be effectively restricted. Further, as the scattering of Cr from the alloy or the like side can be restricted, occurrence of oxidation deterioration of the alloy or the like due to Cr depletion can be restricted.

Preferably, in the cell for a solid oxide fuel cell relating the present invention, said spinel oxide is selected from the group consisting of $NiCo_2O_4$, $(Zn_xCo_{1-x})Co_2O_4$ ($0.45 \leq x \leq 1.00$), $FeMn_2O_4$, $NiMn_2O_4$, $CoMn_2O_4$, $MnFe_2O_4$, $MnNi_2O_4$, $MnCo_2O_4$, $Mn(Mn_{0.25}Co_{0.75})_2O_4$, $(Mn_{0.5}Co_{.5})Co_2O_4$, $TiCo_2O_4$, $ZnFe_2O_4$, $FeCo_2O_4$, $CoFe_2O_4$, $MgCo_2O_4$, $Co_3O_4$, and a mixture of two or more thereof.

With the cell for a solid oxide fuel cell having the above construction, since the above described preferred oxide is employed as the spinel oxide it becomes possible to restrict diffusion of Cr (VI) oxide (or oxyhydroxide) in a gas phase from the side of the alloy or the like to the air electrode side or to the boundary face between the air electrode and the electrolyte, so that occurrence of Cr poisoning of the air electrode can be effectively restricted. Further, as the scattering of Cr from the alloy or the like side can be restricted, occurrence of oxidation deterioration of the alloy or the like due to Cr depletion can be restricted.

Further, with the above-listed preferred spinel oxides, their thermal expansion ratios are relatively close to those of the ferrite stainless steel (thermal expansion ratio: $11 \times 10^{-6} K^{-1}$) used mainly as the substrate or of (La, Sr) (Co, Fe) $O_3$ as the air electrode forming material for use by being bonded thereto (thermal expansion ratio: $15 \sim 21 \times 10^{-6} K^{-1}$) or (La, Sr) $MnO_3$ (thermal expansion ratio: $11 \times 10^{-6} K^{-1}$). For instance, $ZnCo_2O_4$ has a thermal expansion ratio of $9.3 \times 10^{-6} K^{-1}$. $(Zn_{0.45}Co_{0.55})Co_2O_4$ has a thermal expansion ratio of $10.7 \times 10^{-6} K^{-1}$. $MnCo_2O_4$ has a thermal expansion ratio of $11.8 \times 10^{-6} K^{-1}$. Therefore, the coating layer containing the above-described spinel oxide is not easily peeled off the alloy or the like, even when thermal expansion occurs in the alloy or the like and/or the air electrode. Hence, this coating layer can be said to be a coating layer having superior durability.

Incidentally, with the Zn—Co type oxides of the above-described solid oxides, a dense coating layer having high oxygen barrier property can be obtained at relatively low temperatures in comparison with the other materials, thus these being preferred industrially. Further, the Zn—Co type oxides exhibit smaller increase in their resistance at low temperatures (e.g. 650° C.). So, they have another advantage of being capable of maintaining high performance even when the operating temperature of the SOFC is shifted to the lower side.

In the cell for a solid oxide fuel cell relating to the present invention, preferably, said coating layer has a thickness ranging from 0.1 to 100 μm.

With the cell for a solid oxide fuel cell having the above inventive construction, with the thickness of the coating layer ranging from 0.1 to 100 μm, it is possible to reliably restrict diffusion of Cr (VI) oxide (or oxyhydroxide) in a gas phase from the side of the alloy or the like to the air electrode side or to the boundary face between the air electrode and the electrolyte, so that occurrence of Cr poisoning of the air electrode can be effectively restricted. Further, as the scattering of Cr from the alloy or the like side can be restricted, occurrence of oxidation deterioration of the alloy or the like due to Cr depletion can be restricted.

In the cell for a solid oxide fuel cell having the above construction, preferably, said coating layer is prepared by sintering with addition of a sintering agent.

With the cell for a solid oxide fuel cell having the above construction, by effecting sintering with addition of a sintering agent when the coating layer is to be formed on the surface of the alloy or the like, the coating layer becomes denser. As a result, the electric resistance of the coating layer is reduced and the performance of the coating layer as an oxygen barrier is improved. Therefore, it becomes possible to improve the performance as a solid oxide fuel cell and the effect of restricting oxidation from the Cr (III) oxide to Cr (VI) and the effect of restricting decrease in the Cr content (Cr depletion)

in the alloy or the like can be further improved. As a result, decrease in the heat resistance of the alloy or the like per se can be restricted.

EMBODIMENTS OF THE INVENTION

Figure 1:
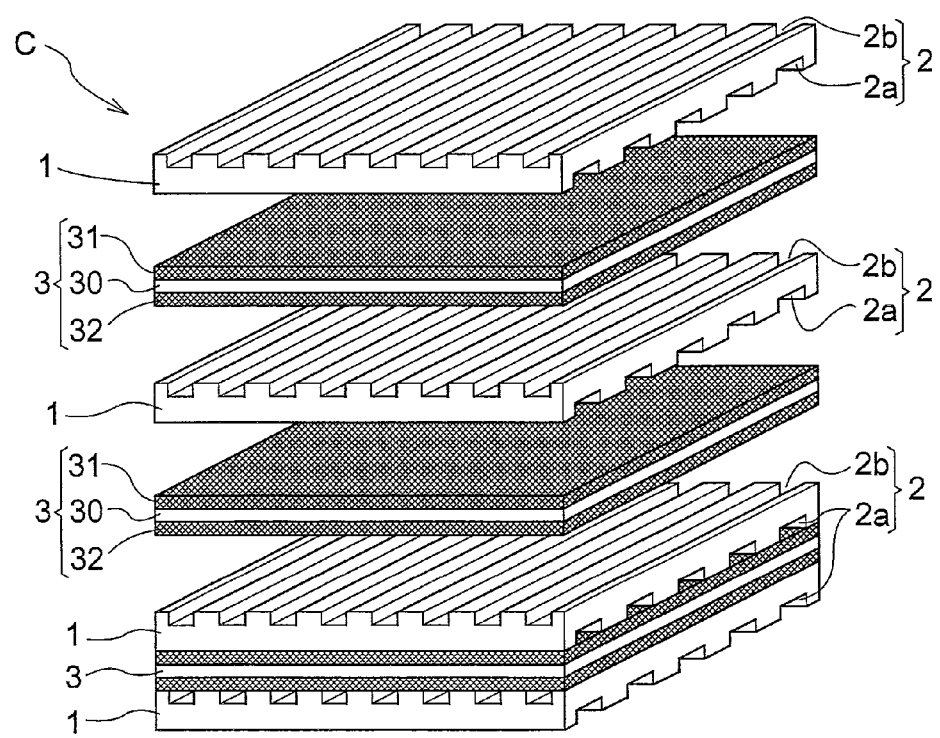
FIG. 1 a schematic perspective view showing a disassembled condition of respective elements of an SOFC cell, FIG. 2 a view explaining the operational principle of the SOFC cell, FIG. 3 a view showing Cr distribution after sintering of an SOFC cell according to EXAMPLE 1, FIG. 4 a view showing Cr distribution after sintering of an SOFC cell according to COMPARISON EXAMPLE 1, FIG. 5 a view showing Cr distribution after sintering of an SOFC cell according to EXAMPLE 2-1, FIG. 6 a view showing Cr distribution after sintering of an SOFC cell according to EXAMPLE 2-2, FIG. 7 a view showing Cr distribution after sintering of an SOFC cell according to EXAMPLE 2-3, FIG. 8 a view showing Cr distribution after sintering of an SOFC cell according to EXAMPLE 3-1, FIG. 9 a view showing Cr distribution after sintering of an SOFC cell according to EXAMPLE 3-2, FIG. 10 a view showing Cr distribution after sintering of an SOFC cell according to EXAMPLE 4, FIG. 11 a view showing Cr distribution after sintering of an SOFC cell according to EXAMPLE 5, FIG. 12 a view showing Cr distribution after sintering of an SOFC cell according to EXAMPLE 6-1, FIG. 13 a view showing Cr distribution after sintering of an SOFC cell according to EXAMPLE 6-2, FIG. 14 a view showing Cr distribution after sintering of an SOFC cell according to EXAMPLE 7-1, FIG. 15 a view showing Cr distribution after sintering of an SOFC cell according to EXAMPLE 7-2, FIG. 16 a view showing Cr distribution after sintering of an SOFC cell according to EXAMPLE 8, FIG. 17 a view showing Cr distribution after sintering of an SOFC cell according to EXAMPLE 9, FIG. 18 a view showing Cr distribution after sintering of an SOFC cell according to EXAMPLE 10, FIG. 19 a view showing Cr distribution after sintering of an SOFC cell according to EXAMPLE 11, FIG. 20 a view showing Cr distribution after sintering of an SOFC cell according to EXAMPLE 12, FIG. 21 a view showing Cr distribution after sintering of an SOFC cell according to EXAMPLE 13, FIG. 22 a view showing Cr distribution after sintering of an SOFC cell according to EXAMPLE 14, FIG. 23 a view showing Cr distribution after sintering of an SOFC cell according to EXAMPLE 15, FIG. 24 a view showing Cr distribution after sintering of an SOFC cell according to EXAMPLE 16-1, FIG. 25 a view showing Cr distribution after sintering of an SOFC cell according to EXAMPLE 16-2, FIG. 26 a view showing Cr distribution after sintering of an SOFC cell according to EXAMPLE 16-3, FIG. 27 a view showing result of analysis (Cr distribution) of an SOFC cell after a durability evaluation test according to EXAMPLE 17, FIG. 28 a view showing result of analysis (Cr distribution) of an SOFC cell after a durability evaluation test according to EXAMPLE 18, FIG. 29 a view showing result of analysis (Cr distribution) of an SOFC cell after a durability evaluation test according to EXAMPLE 19, FIG. 30 a view showing result of analysis (Cr distribution) of an SOFC cell after a durability evaluation test according to EXAMPLE 20, FIG. 31 a view showing result of analysis (Cr distribution) of an SOFC cell after a durability evaluation test according to EXAMPLE 21, FIG. 32 a view showing Cr distribution of an SOFC cell (COMPARISON EXAMPLE 2) having (La, Sr) $CoO_3$ formed on the surface of alloy or the like, FIG. 33 a view showing Cr distribution of in a cross section adjacent a bonding portion between an alloy having $Ag_2O$ coating layer thereon (COMPARISON EXAMPLE 3) and an air electrode, FIG. 34 a table showing listing of results of EXAMPLES 1-16 and COMPARISON EXAMPLE 1, FIG. 35 a constitution diagram of Zn—Co type oxides, FIG. 36 a diagram showing result of phase identification by X-ray diffraction before/after an oxidation treatment of electroless plating of EXAMPLE 16-2, FIG. 37 a diagram showing relationship between temperatures and chemical potentials of oxygen generated by the spinel oxides employed in EXAMPLES 116 and mono metal oxides (an Ellingham diagram), and FIG. 38 a diagram showing relationship between temperatures and equilibrium dissociated oxygen partial pressures of the spinel oxides employed in EXAMPLES 1-16 and mono metal oxides

Embodiments of an SOFC cell relating to the present invention will be described hereinafter with reference to the accompanying drawings.

A cell C for an SOFC includes a unit cell 3 formed by bonding an air electrode 31 formed of a porous material having oxide ion conductivity and electron conductivity to one face of an electrolyte layer 30 formed of a dense body of solid oxide having oxide ion conductivity and bonding a fuel electrode 32 formed of a porous material having electron conductivity to the other face of the electrolyte layer 30.

Further, in the SOFC cell C, the above-described unit cell 3 is clamped between a pair of interconnects 1 via a gas sealant provided, when needed, along the outer peripheral edge thereof. Each interconnect 1 is formed of an alloy or an oxide having electron conductivity and configured for giving/receiving electrons to/from the air electrode 31 or the fuel electrode 32 and defining grooves 2 for supplying an amount of air or hydrogen to the air electrode 31 or the fuel electrode 32. And, as the air electrode 31 and the interconnect 1 are disposed in close contact with each other, the grooves 2 provided on the side of the air electrode 31 act as air flow paths 2a for supplying air to the air electrode 31. On the other hand, as the fuel electrode 32 and the interconnect 1 are disposed in close contact with each other, the grooves 2 provided on the side of the fuel electrode 32 act as fuel flow paths 2b for supplying hydrogen to the fuel electrode 32.

Incidentally, referring additionally to standard materials for use in the above-described respective components constituting the SOFC cell C, as the material for forming the air electrode 31, it is possible to employ e.g. a perovskite oxide of (La, AE) $MO_3$ in which a portion of La in $LaMO_3$ (e.g. M=Mn, Fe, Co) is substituted for by an alkaline earth metal AE (AE=Sr, Ca). As the material for forming the fuel electrode 32, it is possible to employ e.g. cermet of Ni and yttria-stabilized zirconia (YSZ). Further, as the material for forming the electrolyte layer 30, it is possible to employ e.g. yttria-stabilized zirconia (YSZ).

Further, in the SOFC cell C described so far, as the material for forming the interconnect 1, there is employed an alloy or oxide containing Cr, such as Fe—Cr containing alloy which is a ferrite stainless steel, Fe—Cr—Ni alloy which is an austenite stainless steel, Ni—Cr alloy which is a nickel base alloy.

And, a plurality of SOFC cells C are stacked one upon another and clamped together by a plurality of bolts and nuts with application of pressing force thereto in the stacking direction, thus constituting a cell stack.

With this cell stack, for the interconnects 1 disposed at the opposed extreme ends in the stacking direction, it suffices to define therein either the fuel flow paths 2b or the air flow paths 2a. Whereas, in the other interconnects 1 disposed at intermediate portions, the fuel flow paths 2b are formed on one face thereof and the air flow paths 2a are formed on the other face thereof. In the meantime, with a cell stack having the above-described stacking configuration, the interconnects 1 are sometimes called "separators".

And, the SOFC having such cell stacking configuration is generally called a planar SOFC. In the instant embodiment, a planar SOFC will be explained as one example. However, the present invention is applicable also to SOFC's having other constructions.

And, referring to the operation of the SOFC having the SOFC cells C described above, as shown in FIG. 12, an amount of air is supplied to the air electrode 31 through the air flow paths 2a formed in the interconnect 1 adjacent thereto, and an amount of hydrogen is supplied to the fuel electrode 32 through the fuel flow paths 2b formed in the fuel flow paths 2b formed in the interconnect 1 adjacent thereto, and the SOFC operates at an operating temperature of 750° C. approximately. With this operation, at the air electrode 31, $O_2$ reacts with electrons $e^-$ to produce $O^{2-}$ and this $O^{2-}$ migrates to the fuel electrode 32 through the electrolyte layer 30 and $H^2$ supplied to the fuel electrode 32 reacts with this $O^{2-}$, thus producing $H_2O$ and $e^-$. As a result, an electromotive force E is generated between the pair of interconnects 1 and this electromotive force E can be taken out for its utilization.

Further, with this SOFC cell C, during its manufacturing process and for the purpose of e.g. minimizing the contact resistance between the interconnect 1 and the air electrode 31 or the fuel electrode 32, the SOFC cell C under its stacked state is sometimes subjected to a sintering treatment at a sintering temperature ranging from 1000 to 1150° C. which is higher than its operating temperature.

And, in the case of the SOFC cell C formed by bonding interconnects 1 formed of a Cr containing alloy or the like and the air electrode 31, when it is exposed to a high temperature at the time of the sintering treatment or its operation, there occurs a problem that Cr contained in the interconnect 1 oxides and evaporates to scatter about toward the air electrode 1, thus causing Cr poisoning of this air electrode 31.

Further, in such Cr poisoning, Cr contained in the interconnect 1 or $Cr_2O_3$ which is an oxide of Cr (III) generated by oxidation of the Cr described above, is oxidized by $O_2$ or $H_2O$ present on the air electrode 31 side, thus producing $CrO_3$ or $CrO_2(OH)_2$ as an oxide of Cr (VI) in the gas phase. Then, this Cr (VI) oxide migrates toward the air electrode 31 side to be reduced in the vicinity of the boundary face with the electrolyte layer 30 or within the electrode, so that this is deposited as $Cr_2O_3$ or a Cr compound produced by the reaction with the air electrode 31. Incidentally, in the presence of steam, $CrO_2(OH)_2$ tends to be produced, so the scattering of Cr (VI) is more likely to occur.

And, if Cr poisoning of the air electrode 31 has occurred as described above, during cell operation, due to generation of $O^{2-}$ at the boundary face between the air electrode 31 and the electrolyte layer 30 or within the electrode, the reducing reaction of oxygen will be inhibited. Further, this Cr will deprive Sr or Ca doped within the air electrode 31, so that a compound having high resistance such as $SrCr_2O_4$, $SrCrO_4$, $CaCr_2O_4$, $CaCrO_4$, etc. will be formed. Moreover, due to running out or depletion of Sr and/or Ca, the electric resistance of the air electrode 31 per se will increase, which may invite deterioration in the performance of SOFC. Further, due to reduction in the amount of Cr contained in the alloy or the like (Cr depletion), the heat resistance of the alloy or the like may sometimes be reduced.

The SOFC cell C relating to the present invention has a feature that effectively restricts occurrence of Cr poisoning of the air electrode 31 and that effectively restricts also Cr depletion of the alloy or the like. The details of this feature will be described next.

In this inventive SOFC, in order to restrict production of Cr (VI) oxide from the Cr contained in the interconnect 1, on the surface of this interconnect 1, there is formed a coating layer containing a spinel oxide comprised of a first mono metal oxide and a second mono metal oxide, said first mono metal oxide having an equilibrium dissociated oxygen partial pressure at 750° C. ranging from $1.83 \times 10^{-20}$ to $3.44 \times 10^{13}$ atm., said second mono metal oxide having a lower equilibrium dissociated oxygen partial pressure at 750° C. than said first mono metal oxide. Then, this assembly is subjected to a sintering treatment effected at a sintering temperature ranging from 1000° C. to 1150° C. approximately, with keeping the interconnects 1 and the air electrode 3 bonded together. In the meantime, the equilibrium dissociated oxygen partial pressure is set at such a value that each mono metal oxide is reduced to the metal. Also, the equilibrium dissociated oxygen partial pressure is a value obtained from a standard free energy of formation of an oxide made from such elemental substances as a metal and oxygen (that is, a value calculated from the Ellingham diagram). The first mono metal oxide as one of the oxides together constituting the spinel oxide employed for coating layer formation has a lower value for the equilibrium dissociated oxygen partial pressure at 750° C. set to $1.83 \times 10^{20}$ atm. This lower limit is a value corresponding to the equilibrium dissociated oxygen partial pressure at 750° C. of $WO_3$ as one mono metal oxide employed conventionally in such coating layer. In Patent Document 2 as prior art, sorting is done according to the equilibrium dissociated oxygen partial pressures. It is noted that these are values obtained when the respective mono metal oxides are reduced to the corresponding metals. Also, the equilibrium dissociated oxygen partial pressure is a value obtained from a standard free energy of formation of an oxide made from such elemental substances as a metal and oxygen (that is, a value calculated from the Ellingham diagram) And, the above value is set as the upper limit value in the prior art. Further, the second mono metal oxide as the other oxide constituting the spinel oxide can be any mono metal oxide as long as it satisfies the requirement of having a lower equilibrium dissociated oxygen partial pressure at the operating temperature than the first mono metal oxide. It is believed that when a mono metal oxide is rendered into a spinel oxide, it can be present more stable thermodynamically than when it exists by itself and that valency change occurs less likely.

Therefore, the above sintering treatment restricts oxidation, that is, change of valency of Cr contained in the interconnect 1 to C4 (VI) having valency of $6^+$. Hence, production of $CrO_3$, $CrO_2(OH)_2$ as gas phase oxide of Cr (VI). As a result, it is possible to effectively restrict occurrence of Cr poisoning due to migration of such Cr (VI) oxide toward the air electrode 31. Further, as it is also possible to restrict reduction in the Cr content (Cr depletion) of the alloy or the like, it is possible to restrict reduction in the heat resistance of the alloy or the like per se.

Next, there will be described in details some examples of inventive coating layers each containing a spinel oxide to be formed for restricting production of Cr (VI) oxide from Cr contained in the interconnect 1 along with some comparison examples.

[Preparation of Alloy Sample with Coating Layer Formed Thereon]

"A spinel oxide" is a composite oxide containing two kinds of metal and represented in general by a chemical formula: $AB_2O_4$ (A and B are metal elements).

In this invention, by using wet coating layer forming technique or dry coating layer forming technique, a coating layer containing a spinel oxide was formed on the surface of an alloy comprising a ferrite stainless steel flat plate to be made into the interconnect 1. Then, the surface of the alloy flat plate thus prepared was ground to #600 by sandpaper.

As the wet coating layer forming technique, the dipping method was employed. First, to an amount of spinel oxide powder, alcohol (1-methoxy-2-propanol) was added and to a binder (hydroxypropylcellulose), zirconia balls were added and then mixed together with using a paint shaker. Thereafter, the alloy flat plate was dipped in a mixture solution containing the spinel oxide power and then pulled up and then dried inside a thermostat bath adjusted to 50° C. Then, the dried alloy flat plate was sintered at 1000° C. for 2 hours in an electric furnace and then slowly cooled, whereby an alloy sample was obtained.

As the dry coating layer forming technique, the sputtering method was employed. Some non-limiting examples of kinds of sputtering include high-frequency sputtering, reactive DC (direct-current) magnetron sputtering, etc.

Meanwhile, in this detailed disclosure, for the sake of convenience, the "coating layer containing a spinel oxide (e.g. coating layer containing $NiCo_2O_4$)" will be referred to as "spinel oxide coating layer, e.g. "Ni—$Co_2O_4$ coating layer" for short).

[Effect Confirming Test]

In order to confirm the advantageous effect afforded by the present invention, voltage drop (electric resistance) in the alloy sample formed with the coating layer was determined. By determining such voltage drop in the alloy sample, it is possible to judge whether the performance required for an SOFC is ensured or not. As a specific testing method, first, a sintering treatment was effected for 2 hours in the atmosphere at a sintering temperature ranging from 1000 to 1150° C., with the alloy sample and air electrode material being kept bonded together. Next, with assuming the operational condition of SOFC, a direct current of 0.3 A/cm² was continuously supplied to the alloy sample in the atmosphere at an operation temperature of 750° C. And, this condition was retained for 50 hours. Then, after this 50 hours of retention under the above condition, the voltage drop (mV) in the alloy sample (alloy+ coating layer) was determined.

Further, distribution of Cr was determined in the cross section in the vicinity of the bonded portion between the alloy sample and the air electrode. Based on this Cr distribution determination, occurrence or non-occurrence of Cr poisoning at the air electrode can be determined. As a specific method of testing, first, a sintering treatment was effected on the alloy sample for 2 hours in the atmosphere at sintering temperature ranging from 1000 to 1150° C. Then, the Cr distribution in the cross section adjacent the bonded portion between the alloy sample after this sintering operation and the air electrode was analyzed with using an electron probe micro analyzer (EPMA).

Incidentally, in these effect confirming tests, both the example and the comparison example employed Fe—Cr alloy (Cr content: 22 wt %) as the alloy and (La, Sr)(Co, Fe)$O_3$ as the air electrode.

First Embodiment

Figure 2:
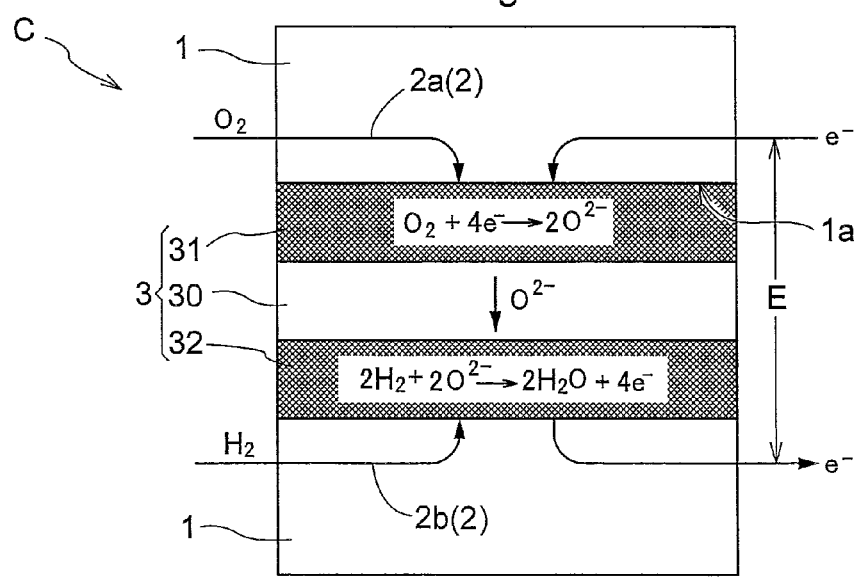

In this first embodiment, $NiCo_2O_4$ was chosen as a spinel oxide. Prior to execution of sintering treatment, an $NiCo_2O_4$ coating layer was formed at least on the surface of the boundary surface 1a (see FIG. 2) of the interconnect 1 relative to the air electrode 31.

That is, with an SOFC cell C having the $NiCo_2O_4$ coating layer on the boundary surface 1a of the interconnect 1, it is presumed that the equilibrium dissociated oxygen partial pressure of $Co_2O_3$ as the first mono metal oxide constituting the $NiCo_2O_4$ coating layer is $3.44 \times 10^{-13}$ atm with substitution of the equilibrium dissociated oxygen partial pressure of $Co_3O_4$. On the other hand, the equilibrium dissociated oxygen partial pressure of NiO as the second mono metal oxide constituting the $NiCo_2O_4$ coating layer is $2.72 \times 10^{16}$ atm, which is lower than the equilibrium dissociated oxygen partial pressure of $Co_2O_3$. Meanwhile, this $NiCo_2O_4$ coating layer has not only good heat resistance, but also a dense structure. Therefore, supply of oxygen steam or the like as an oxidant via this $NiCo_2O_4$ coating layer toward the interconnect 1 is effectively prevented and also migration of Cr (VI) oxide via this $NiCo_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 1

Next, there will be described results of testing in which Cr distribution in the cross section adjacent the bonded portion between the alloy and the air electrode was determined on the SOFC cell (EXAMPLE 1) manufactured with forming $NiCo_2O_4$ coating layer by the wet coating layer forming technique on the surfaces (both sides) of the alloy employed in the interconnect or the like, prior to execution of the sintering treatment as done in the above-described first embodiment.

Also, there will be described results of testing of Cr distribution in the cross section adjacent the bonded portion between the alloy and the air electrode, conduced on an SOFC cell (COMPARISON EXAMPLE 1) manufactured without forming the coating layer on the surface of the alloy. In the meantime, this COMPARISON EXAMPLE 1 is to serve as a comparison example respectively for EXAMPLES 2-16 to be described later.

For the SOFC cell of the above-described Example 1, the dipping method was employed as the wet coating layer forming technique for forming the $NiCo_2O_4$ coating layer on the surfaces of the alloy and thickness of the $NiCo_2O_4$ coating layer was about 5 to 30 μm.

In accordance with the above-described procedure of the effect confirming test, voltage drop at 750° C. in the interconnect (alloy+$NiCo_2O_4$ coating layer) was determined to be 13.1 mV. Incidentally, the electric conductivity of the $NiCo_2O_4$ sintered product was 2.06 S/cm at the 750° C. atmosphere.

Next, for each SOFC cell, the Cr distribution in the cross section adjacent the bonded portion between the alloy and the air electrode was analyzed by EPMA.

Figure 3:
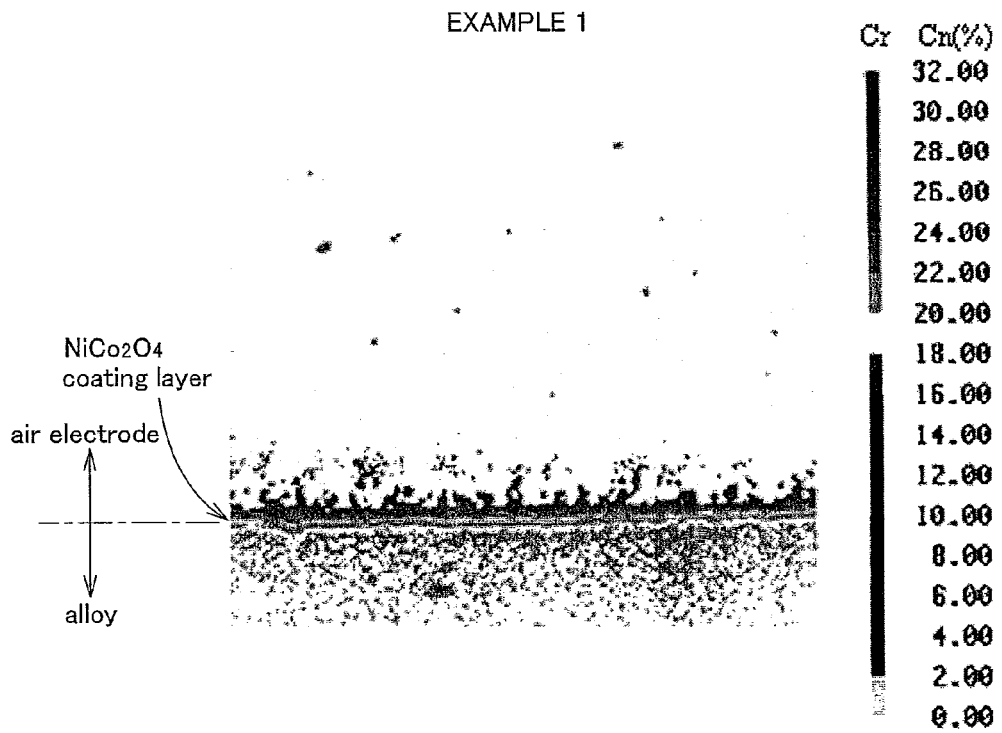
Figure 4:
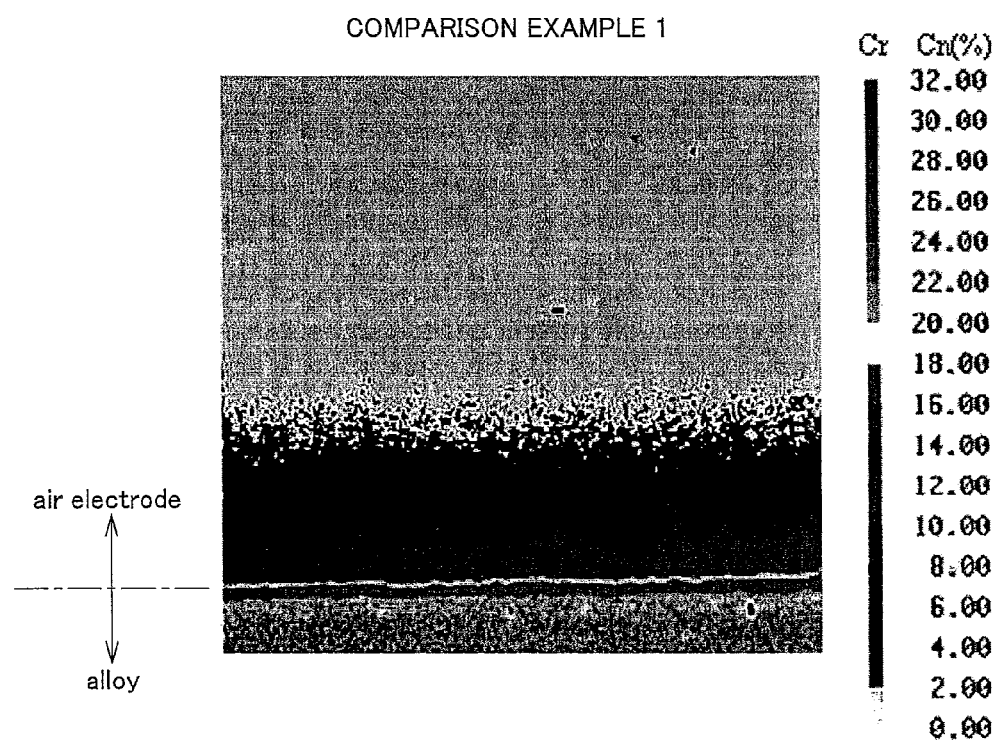

FIG. 3 shows the result of analysis of the Cr distribution after sintering of the SOFC cell of EXAMPLE 1. FIG. 4 shows the result of analysis of the Cr distribution after sintering of the SOFC cell according to COMPARISON EXAMPLE 1, Meanwhile, in these figures, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 1 having the $NiCo_2O_4$ coating layer on the surface of the alloy, the Cr concentration was about 0% for substantially entire air electrode and little Cr poisoning at the air electrode was found.

On the other hand, in the case of the SOFC cell according to COMPARISON EXAMPLE 1 without the coating layer formed on the alloy, as shown in FIG. 4, the Cr concentration at the area of the air electrode close to the alloy (the dark gray area of the air electrode in FIG. 4) was as high as about 10 to about 14%. And, the concentration was as high as about 2 to 10% even at the areas which are rather distant from the above areas, so significant occurrence of Cr poisoning at the air electrode was confirmed.

Second Embodiment

In this second embodiment, $(Zn_xCo_{1-x})Co_2O_4$ ($0.45 \leq x \leq 1.00$) was chosen as a spinel oxide. Prior to execution of sintering treatment, a $(Zn_xCo_{1-x})Co_2O_4$ coating layer was formed at least on the surface of the boundary surface 1a (see FIG. 2) of the interconnect 1 relative to the air electrode 31.

That is, with an SOFC cell C having the $(Zn_xCo_{1-x})Co_2O_4$ coating layer on the boundary surface 1a of the interconnect 1, it is presumed that the equilibrium dissociated oxygen partial pressure of $Co_3O_4$ as the first mono metal oxide constituting the $(Zn_xCo_{1-x})Co_2O_4$ coating layer is $3.44 \times 10^{-13}$ atm with substitution of the equilibrium dissociated oxygen partial pressure of $CO_2O_3$. On the other hand, the equilibrium dissociated oxygen partial pressure of ZnO as the second mono metal oxide constituting the $(Zn_xCo_{1-x})Co_2O_4$ coating layer is $5.94 \times 10^{-26}$ atm, which is lower than the equilibrium dissociated oxygen partial pressure of $CO_2O_3$. Meanwhile, this $(Zn_xCo_{1-x})Co_2O_4$ coating layer has not only good heat resistance, but also a dense structure. Therefore, supply of oxygen steam or the like as an oxidant via this $(Zn_xCo_{1-x})Co_2O_4$ coating layer toward the interconnect 1 is effectively prevented and also migration of Cr (VI) oxide via this $(Zn_xCo_{1-x})Co_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

As $(Zn_xCo_{1-x})Co_2O_4$, there were chosen $ZnCo_2O_4$ (EXAMPLES 2-1, 2-2) with x=1 and $(Zn_{0.45}Cu_{0.55})Co_2O_4$ (EXAMPLE 2-3) with x=0.45.

Incidentally, as understood from the constitution diagram (FIG. 35) of the Zn—Co oxides to be described later, in $(Zn_xCo_{1-x})Co_2O_4$, the spinel structure is the main component in the range from 200 to 800° C. and in some compositions thereof, a trace amount of ZnO is contained therein. The equilibrium dissociated oxygen partial pressure of ZnO is $5.95 \times 10^{-26}$ atm, which is sufficiently lower than the equilibrium dissociated oxygen partial pressure of $WO_3$ at 750° C., thus being not problematic for the effect of restricting oxidation of Cr (III) oxide to Cr (IV). Therefore, within the range of $0 \leq x \leq 1.00$, the spinel structure is the main phase in any composition ratio, so it is believed that similar physical properties will be exhibited thereby, hence, being advantageously used as an SOFC cell. However, the range of $0.45 \leq x \leq 1.00$ is particularly preferred since it is believed that with this range, the equilibrium dissociated oxygen partial pressures are sufficiently low, thus providing greater Cr oxidation restricting effect.

The range of $0.45 \leq x \leq 0.6$ is even more preferred since the spinel mono-phase structure can be maintained without the crystalline structure of $(Zn_x Co_{1-x})Co_2O_4$ becoming mixed crystal with hexagonal crystal.

Example 2-1

Next, there will be described results of testing in which Cr distributions in the cross section adjacent the bonded portion between the alloy and the air electrode were determined on the SOFC cell (EXAMPLE 2-1) manufactured with forming $ZnCo_2O_4$ coating layer by the wet coating layer forming technique on the surface (both sides) of the alloy employed in the interconnect or the like, prior to execution of the sintering treatment as done in the above-described second embodiment.

For the SOFC cell of the above-described EXAMPLE 2-1, the dipping method was employed as the wet coating layer forming technique for forming the $ZnCo_2O_4$ coating layer on the surfaces of the alloy and thickness of the $ZnCo_2O_4$ coating layer was about 5 to 30 μm.

In accordance with the above-described procedure of the effect confirming test, voltage drop at 750° C. in the interconnect (alloy+$ZnCo_2O_4$ coating layer) was determined to be 13.2 mV. Incidentally, the electric conductivity of the $ZnCo_2O_4$ sintered product was 0.36 S/cm at the 750° C. atmosphere.

Next, for the SOFC cell, the Cr distribution in the cross section adjacent the bonded portion between the alloy and the air electrode was analyzed by EPMA.

Figure 5:
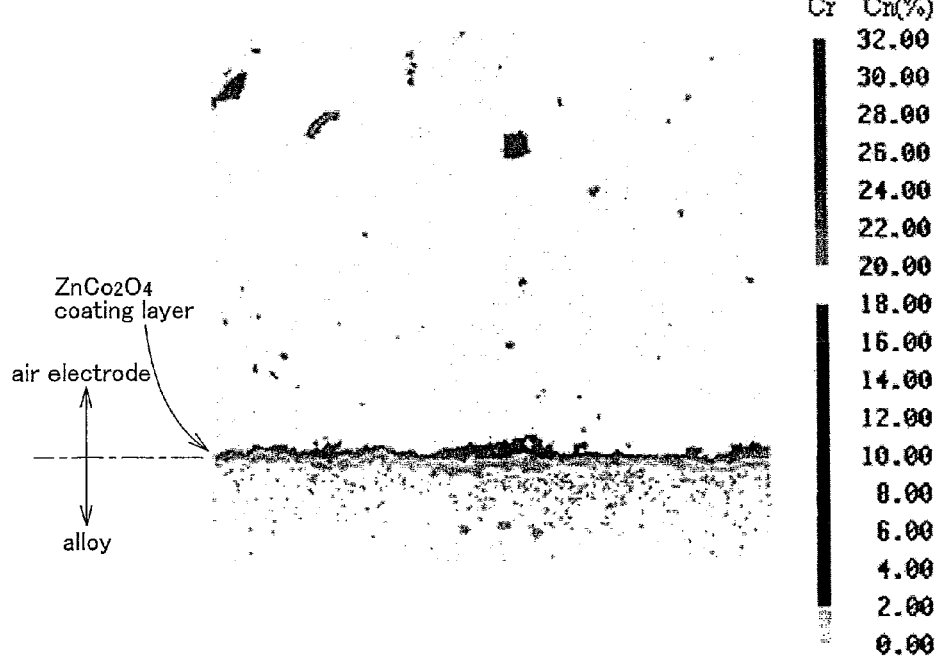

FIG. 5 shows the result of analysis of the Cr distribution of the sintered SOFC cell of EXAMPLE 2-1. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 2-1 having the $ZnCo_2O_4$ coating layer on the surface of the alloy, as shown in FIG. 5, the Cr concentration was about 0% for substantially entire air electrode and little Cr poisoning at the air electrode was found.

Example 2-2

When the coating layer is to be formed on the surface of the alloy or the like, if a sintering agent is added, this results in even greater density of the coating layer formed. As a result, it is believed that the electric resistance of the coating layer will be reduced and the performance as the solid oxide fuel cell will be further enhanced.

Then, in the above-described second embodiment, in the course of formation of $ZnCo_2O_4$ coating layer, to $ZnCo_2O_4$, 2 wt % of a sintering agent comprised of $B_2O_3$ and ZnO was added and then a sintering operation was effected to produce an SOFC cell (EXAMPLE 2-2). On this SOFC cell, the Cr distribution in the cross section adjacent the bonded portion between the alloy and the air electrode was observed. The result of this test will be described next.

In EXAMPLE 2-2, the coating layer forming method, the thickness of the coating layer formed, etc. were same as the above-described EXAMPLE 2-1.

For the SOFC cell of EXAMPLE 2-2, the Cr distribution in the cross section adjacent the bonded portion between the alloy and the air electrode was analyzed by EPMA.

Figure 6:

FIG. 6 shows the result of analysis of the Cr distribution of the sintered SOFC cell of EXAMPLE 2-2. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 2-2 having the $ZnCo_2O_4$ coating layer on the surface of the alloy, as shown in FIG. 6, the Cr concentration was about 0% for substantially entire air electrode and little Cr poisoning at the air electrode was found.

Further, in accordance with the above-described procedure of the effect confirming test, voltage drop at 750° C. in the interconnect (alloy+$ZnCo_2O_4$ coating layer) was determined to be 10.7 mV. This value is even smaller than the value of voltage drop (13.2 mV) in EXAMPLE 2-1 without addition of any sintering agent. Namely, it was confirmed that addition of sintering agent results in reduction in the electric resistance of coating layer.

Example 2-3

Next, there will be described results of testing in which Cr distributions in the cross section adjacent the bonded portion between the alloy and the air electrode were determined on the SOFC cell manufactured with forming $(Zn_{0.45}Cu_{0.55})Co_2O_4$ coating layer by the wet coating layer forming technique on the surfaces (both sides) of the alloy employed in the interconnect or the like, prior to execution of the sintering treatment as done in the above-described second embodiment.

For the SOFC cell of the above-described EXAMPLE 2-3, the dipping method was employed as the wet coating layer forming technique for forming the $(Zn_{0.45}Co_{0.55})Co_2O_4$ coating layer on the surface of the alloy and thickness of the $(Zn_{0.45}Co_{0.55})Co_2O_4$ coating layer was about 5 to 30 μm.

In accordance with the above-described procedure of the effect confirming test, voltage drop at 750° C. in the interconnect (alloy+$(Zn_{0.45}Cu_{0.55})Co_2O_4$ coating layer) was determined to be 10.8 mV. Incidentally, the electric conductivity of the $(Zn_{0.45}Co_{0.55})Co_2O_4$ sintered product was 1.04 S/cm at the 750° C. atmosphere.

Next, for the SOFC cell, the Cr distribution in the cross section adjacent the bonded portion between the alloy and the air electrode was analyzed by EPMA.

Figure 7:
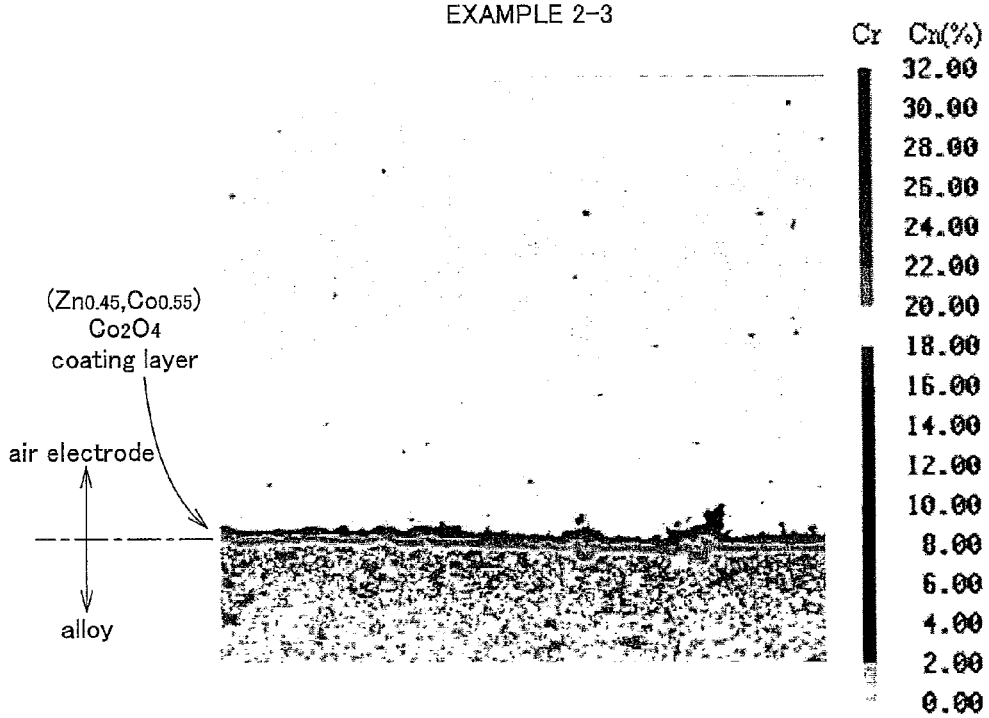

FIG. 7 shows the result of analysis of the Cr distribution of the sintered SOFC cell of EXAMPLE 2-3. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 2-3 having the $(Zn_{0.45}Cu_{0.55})Co_2O_4$ coating layer on the surface of the alloy, as shown in FIG. 7, the Cr concentration was about 0% for substantially entire air electrode and little Cr poisoning at the air electrode was found.

Figure 35:
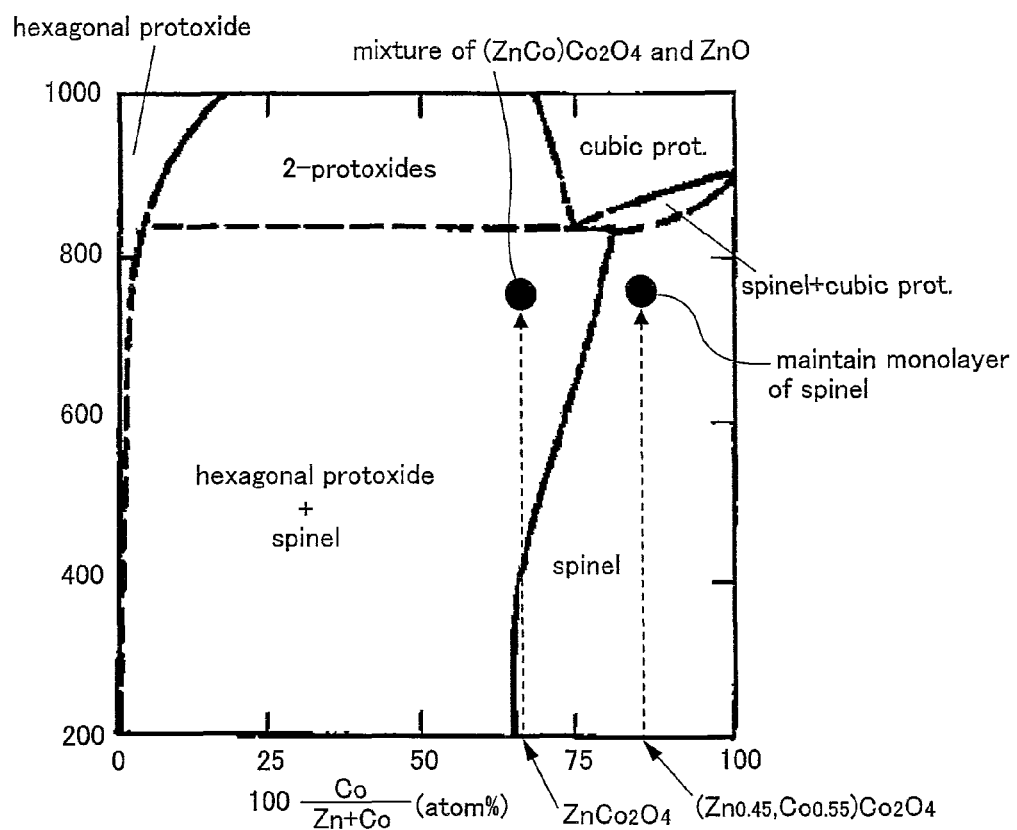

FIG. 35 shows a constitution diagram of Zn—Co oxides.

As shown in the figure, at 750° C. near the operating temperature, $ZnO_2O_4$ presents a coexistent state of two phases of the spinel phase and ZnO phase and the phase separation occurs in the course of temperature elevation from the room temperature. On the other hand, as for $(Zn_xCo_{1-x})$, it is capable of maintaining the mono spinel phase in the range from room temperature to 750° C., in the range of $x \leq 0.60$ including $(Zn_{0.45}Co_{0.55})Co_2O_4$.

From the viewpoint of durability, it is desired that the material constituting the fuel cell have higher stability and its spinel structure not easily change.

That is, $ZnCo_2O_4$ maintains high Cr scattering restricting effect even when phase separation occurs, so can be used without any problem. However, when its long-term use such as use for 10 years or more is considered, $(Zn_{0.45}Cu_{0.55})Co_2O_4$ that shows less possibility of phase separation will be more preferably used in terms of the stability of the spinel structure.

Basically, the oxidizing property of Cr (III) oxide to Cr (VI) is determined by the equilibrium dissociated oxygen partial pressures of the alloy coating layer materials. In $(Zn_xCo_{1-x})Co_2O_4$ (0.45 of the oxides constituting it, $Co_3O_4$ is the oxide (first mono metal oxide) having the higher equilibrium dissociated oxygen partial pressure at 750° C., and its equilibrium dissociated oxygen partial pressure is $3.44 \times 10^{-13}$ atm (using substitution by the equilibrium dissociated oxygen partial pressure of $Co_3O_4$). On the other hand, ZnO is the oxide (second mono metal oxide) having the equilibrium dissociated oxygen partial pressure lower than that, and its equilibrium dissociated oxygen partial pressure is $5.94 \times 10^{-26}$ atm.

Then, in comparison between $ZnCo_2O_4$ and $(Zn_{0.45}Co_{0.55})Co_2O_4$,
in the second mono metal oxide:
$ZnCo_2O_4$:ZnO ($5.94 \times 1^{-26}$ atm) 100%
$(Zn_{0.45}Co_{0.55})Co_2O_4$:ZnO ($5.94 \times 10^{-26}$ atm) 45%
CoO ($2.9 \times 10^{-17}$ atm) 55%.
Therefore, of the compounds represented as $(Zn_xCo_{1-x})Co_2O_4$, $ZnCo_2O_4$ (x=1) has the lower equilibrium dissociated oxygen partial pressure than $(Zn_{0.45}Co_{0.55})Co_2O_4$, so the oxidation of Cr (III) oxide to Cr (VI) will occur less likely.

Namely, from the view point of the equilibrium dissociated oxygen partial pressure of the second mono metal oxide, it may be said that the greater the value of x, the smaller the equilibrium dissociated oxygen partial pressure, and the higher the effect of restricting oxidation of Cr (III) oxide to Cr (VI). Therefore, since sufficient Cr oxidation restricting effect was confirmed with $(Zn_{0.45}Cu_{0.55})Co_2O_4$ of x=0.45 (see EXAMPLE 20), it is believed that provided $0.45 \leq x \leq 1.00$, the effect of restricting oxidation of Cr (III) oxide to Cr (VI) will be found with $(Zn_xCo_{1-x})Co_2O_4$ also.

Therefore, as $(Zn_xCo_{1-x})Co_2O_4$, it is required that the value of x should be large to some extent from the viewpoint of equilibrium dissociated oxygen partial pressure. On the other hand, in the viewpoint of stability of spinel structure, the smaller the value of x, the better. As a result of these, it is preferred that $(Zn_xCo_{1-x})Co_2O_4$, have $0.45 \leq x \leq 1.00$.

Third Embodiment

In this third embodiment, $FeMn_2O_4$ was chosen as a spinel oxide. Prior to execution of sintering treatment, an $FeMn_2O_4$ coating layer was formed at least on the surface of the boundary surface 1a (see FIG. 2) of the interconnect 1 relative to the air electrode 31.

That is, with an SOFC cell C having the $FeMn_2O_4$ coating layer on the boundary surface 1a of the interconnect 1, it is presumed that the equilibrium dissociated oxygen partial pressure of $Fe_2O_3$ as the first mono metal oxide constituting the $FeMn_2O_4$ coating layer is $1.31 \times 10^{-19}$. On the other hand, the equilibrium dissociated oxygen partial pressure of $Mn_2O_3$ as the second mono metal oxide constituting the $FeMn_2O_4$ coating layer is $2.31 \times 10^{-24}$ atm, which is lower than the equilibrium dissociated oxygen partial pressure of $Fe_2O_3$. Meanwhile, this $FeMn_2O_4$ coating layer has not only good heat resistance, but also a dense structure. Therefore, supply of oxygen steam or the like as an oxidant via this $FeMn_2O_4$ coating layer toward the interconnect 1 is effectively prevented and also migration of Cr (VI) oxide via this $FeMn_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 3-1

Next, there will be described results of testing in which Cr distribution in the cross section adjacent the bonded portion between the alloy and the air electrode was determined on the SOFC cell (EXAMPLE 3-1) manufactured with forming $FeMn_2O_4$ coating layer by the dry coating layer forming technique on the surface (one side) of the alloy employed in the interconnect or the like, prior to execution of the sintering treatment as done in the above-described third embodiment.

For the SOFC cell of the above-described EXAMPLE 3-1, the sputtering method was employed as the dry coating layer forming technique for forming the $FeMn_2O_4$ coating layer on the surface of the alloy and thickness of the $FeMn_2O_4$ coating layer was about 2 µm.

In accordance with the above-described procedure of the effect confirming test, voltage drop at 750° C. in the interconnect (alloy+$FeMn_2O_4$ coating layer) was determined to be 37.8 mV.

Next, for the SOFC cell, the Cr distribution in the cross section adjacent the bonded portion between the alloy and the air electrode was analyzed by EPMA.

Figure 8:
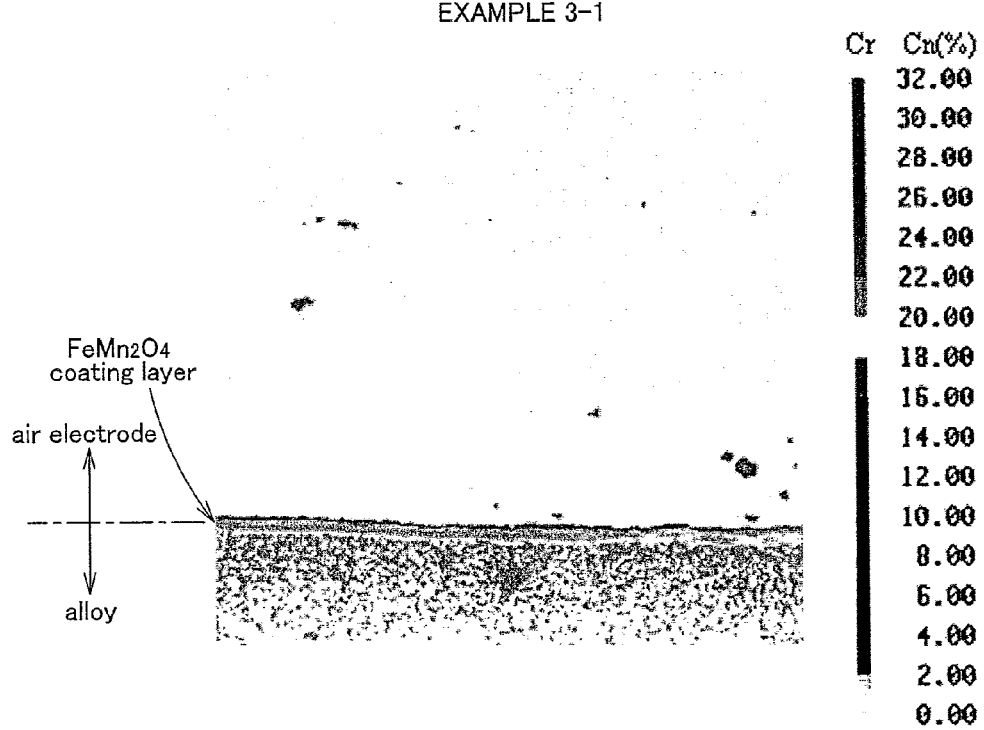

FIG. 8 shows the result of analysis of the Cr distribution of the sintered SOFC cell of EXAMPLE 3-1. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 µm.

As the results of these tests, in the SOFC cell according to EXAMPLE 3-1 having the $FeMn_2O_4$ coating layer on the surface of the alloy, the Cr concentration was about 0% for substantially entire air electrode and little Cr poisoning at the air electrode was found.

Example 3-2

Next, there will be described results of testing in which Cr distributions in the cross section adjacent the bonded portion between the alloy and the air electrode were determined on the SOFC cell (EXAMPLE 3-2) manufactured with forming $FeMn_2O_4$ coating layer by the wet coating layer forming technique on the surfaces (both sides) of the alloy employed in the interconnect or the like, prior to execution of the sintering treatment as done in the above-described third embodiment.

For the SOFC cell of the above-described EXAMPLE 3-2, the dipping method was employed as the wet coating layer forming technique for forming the $FeMn_2O_4$ coating layer on the surface of the alloy and thickness of the $FeMn_2O_4$ coating layer was about 5 to 30 µm.

In accordance with the above-described procedure of the effect confirming test, voltage drop at 750° C. in the interconnect (alloy+$FeMn_2O_4$ coating layer) was determined to be 25.9 mV. Incidentally, the electric conductivity of the $FeMn_2O_4$ sintered product was 0.62 S/cm at the 750° C. atmosphere.

Next, for the SOFC cell, the Cr distribution in the cross section adjacent the bonded portion between the alloy and the air electrode was analyzed by EPMA.

FIG. 9 shows the result of analysis of the Cr distribution of the sintered SOFC cell of EXAMPLE 3-2. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 µm.

As the results of these tests, in the SOFC cell according to EXAMPLE 3-2 having the $FeMn_2O_4$ coating layer on the surface of the alloy, as shown in FIG. 9, the Cr concentration was about 0% for substantially entire air electrode and little Cr poisoning at the air electrode was found.

Fourth Embodiment

In this fourth embodiment, $NiMn_2O_4$ was chosen as a spinel oxide. Prior to execution of sintering treatment, an $NiMn_2O_4$ coating layer was formed at least on the surface of the boundary surface 1a (see FIG. 2) of the interconnect 1 relative to the air electrode 31.

That is, with an SOFC cell C having the $NiMn_2O_4$ coating layer on the boundary surface 1a of the interconnect 1, it is presumed that the equilibrium dissociated oxygen partial pressure of NiO as the first mono metal oxide constituting the $NiMn_2O_4$ coating layer is $2.72 \times 10^{16}$. On the other hand, the equilibrium dissociated oxygen partial pressure of $Mn_2O_3$ as the second mono metal oxide constituting the $NiMn_2O_4$ coating layer is $2.31 \times 10^{-24}$ atm, which is lower than the equilibrium dissociated oxygen partial pressure of NiO. Meanwhile, this $NiMn_2O_4$ coating layer has not only good heat resistance, but also a dense structure. Therefore, supply of oxygen steam or the like as an oxidant via this $NiMn_2O_4$ coating layer toward the interconnect 1 is effectively prevented and also migration of Cr (VI) oxide via this $NiMn_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 4

Next, there will be described results of testing in which Cr distributions in the cross section adjacent the bonded portion between the alloy and the air electrode were determined on the SOFC cell (EXAMPLE 4) manufactured with forming $NiMn_2O_4$ coating layer by the wet coating layer forming technique on the surfaces (both sides) of the alloy employed in the interconnect or the like, prior to execution of the sintering treatment as done in the above-described fourth embodiment.

For the SOFC cell of the above-described EXAMPLE 4, the dipping method was employed as the wet coating layer forming technique for forming the $NiMn_2O_4$ coating layer on the surface of the alloy and thickness of the $NiMn_2O_4$ coating layer was from about 5 to 30 μm.

In accordance with the above-described procedure of the effect confirming test, voltage drop at 750° C. in the interconnect (alloy+$NiMn_2O_4$ coating layer) was determined to be 19.4 mV. Incidentally, the electric conductivity of the $NiMn_2O_4$ sintered product was 4.32 S/cm at the 750° C. atmosphere.

Next, for the SOFC cell, the Cr distribution in the cross section adjacent the bonded portion between the alloy and the air electrode was analyzed by EPMA.

FIG. 10 shows the result of analysis of the Cr distribution of the sintered SOFC cell of EXAMPLE 4. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 4 having the $NiMn_2O_4$ coating layer on the surface of the alloy, as shown in FIG. 10, the Cr concentration was about 0% for substantially entire air electrode and little Cr poisoning at the air electrode was found.

Fifth Embodiment

In this fifth embodiment, $CoMn_2O_4$ was chosen as a spinel oxide. Prior to execution of sintering treatment, a $CoMn_2O_4$ coating layer was formed at least on the surface of the boundary surface 1a (see FIG. 2) of the interconnect 1 relative to the air electrode 31.

That is, with an SOFC cell C having the $CoMn_2O_4$ coating layer on the boundary surface 1a of the interconnect 1, it is presumed that the equilibrium dissociated oxygen partial pressure of CoO as the first mono metal oxide constituting the $CoMn_2O_4$ coating layer is $2.90 \times 10^{-17}$. On the other hand, the equilibrium dissociated oxygen partial pressure of $Mn_2O_3$ as the second mono metal oxide constituting the $NiMn_2O_4$ coating layer is $2.31 \times 10^{-24}$ atm, which is lower than the equilibrium dissociated oxygen partial pressure of CoO. Meanwhile, this $CoMn_2O_4$ coating layer has not only good heat resistance, but also a dense structure. Therefore, supply of oxygen steam or the like as an oxidant via this $CoMn_2O_4$ coating layer toward the interconnect 1 is effectively prevented and also migration of Cr (VI) oxide via this $CoMn_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 5

Next, there will be described results of testing in which Cr distributions in the cross section adjacent the bonded portion between the alloy and the air electrode were determined on the SOFC cell (EXAMPLE 5) manufactured with forming $CoMn_2O_4$ coating layer by the wet coating layer forming technique on the surfaces (both sides) of the alloy employed in the interconnect or the like, prior to execution of the sintering treatment as done in the above-described fifth embodiment.

For the SOFC cell of the above-described EXAMPLE 5, the dipping method was employed as the wet coating layer forming technique for forming the $CoMn_2O_4$ coating layer on the surface of the alloy and thickness of the $CoMn_2O_4$ coating layer was from about 5 to 30 μm.

In accordance with the above-described procedure of the effect confirming test, voltage drop at 750° C. in the interconnect (alloy+$CoMn_2O_4$ coating layer) was determined to be 17.9 mV. Incidentally, the electric conductivity of the $CoMn_2O_4$ sintered product was 0.81 S/cm at the 750° C. atmosphere.

Next, for the SOFC cell, the Cr distribution in the cross section adjacent the bonded portion between the alloy and the air electrode was analyzed by EPMA.

Figure 11:
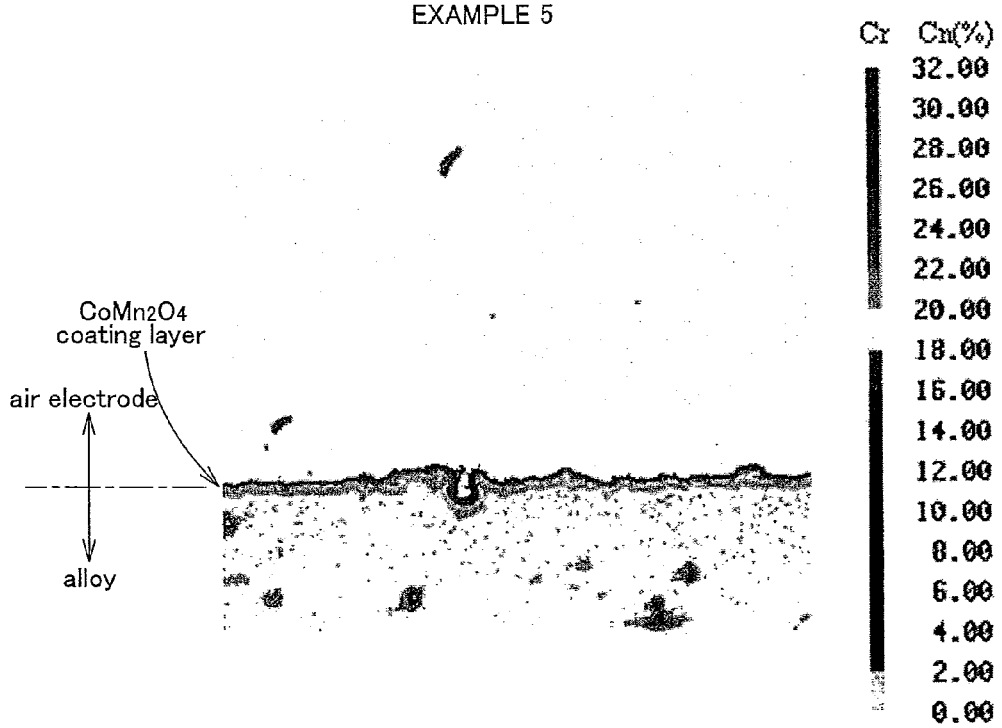

FIG. 11 shows the result of analysis of the Cr distribution of the sintered SOFC cell of EXAMPLE 5. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 5 having the $CoMn_2O_4$ coating layer on the surface of the alloy, the Cr concentration was about 0% for substantially entire air electrode and little Cr poisoning at the air electrode was found.

Sixth Embodiment

In this sixth embodiment, $MnFe_2O_4$ was chosen as a spinel oxide. Prior to execution of sintering treatment, an $MnFe_2O_4$ coating layer was formed at least on the surface of the boundary surface 1a (see FIG. 2) of the interconnect 1 relative to the air electrode 31.

That is, with an SOFC cell C having the $MnFe_2O_4$ coating layer on the boundary surface 1a of the interconnect 1, it is presumed that the equilibrium dissociated oxygen partial pressure of $Fe_2O_3$ as the first mono metal oxide constituting the $MnFe_2O_4$ coating layer is $1.31 \times 10^{-19}$. On the other hand, the equilibrium dissociated oxygen partial pressure of MnO as the second mono metal oxide constituting the $MnFe_2O_4$ coating layer is $2.38 \times 10^{-32}$ atm is lower than the equilibrium dissociated oxygen partial pressure of $Fe_2O_3$. Meanwhile, this $MnFe_2O_4$ coating layer has not only good heat resistance, but also a dense structure. Therefore, supply of oxygen steam or the like as an oxidant via this $MnFe_2O_4$ coating layer toward the interconnect 1 is effectively prevented and also migration of Cr (VI) oxide via this $MnFe_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 6-1

Next, there will be described results of testing in which Cr distributions in the cross section adjacent the bonded portion between the alloy and the air electrode were determined on the SOFC cell manufactured with forming $MnFe_2O_4$ coating layer by the dry coating layer forming technique on the surfaces (one side) of the alloy employed in the interconnect or the like, prior to execution of the sintering treatment as done in the above-described sixth embodiment.

For the SOFC cell of the above-described EXAMPLE 6-1, the sputtering method was employed as the dry coating layer forming technique for forming the $MnFe_2O_4$ coating layer on the surface of the alloy and thickness of the $MnFe_2O_4$ coating layer was about 2 μm.

In accordance with the above-described procedure of the effect confirming test, voltage drop at 750° C. in the interconnect (alloy+$MnFe_2O_4$ coating layer) was determined to be 36.1 mV.

Next, for the SOFC cell, the Cr distribution in the cross section adjacent the bonded portion between the alloy and the air electrode was analyzed by EPMA.

Figure 12:
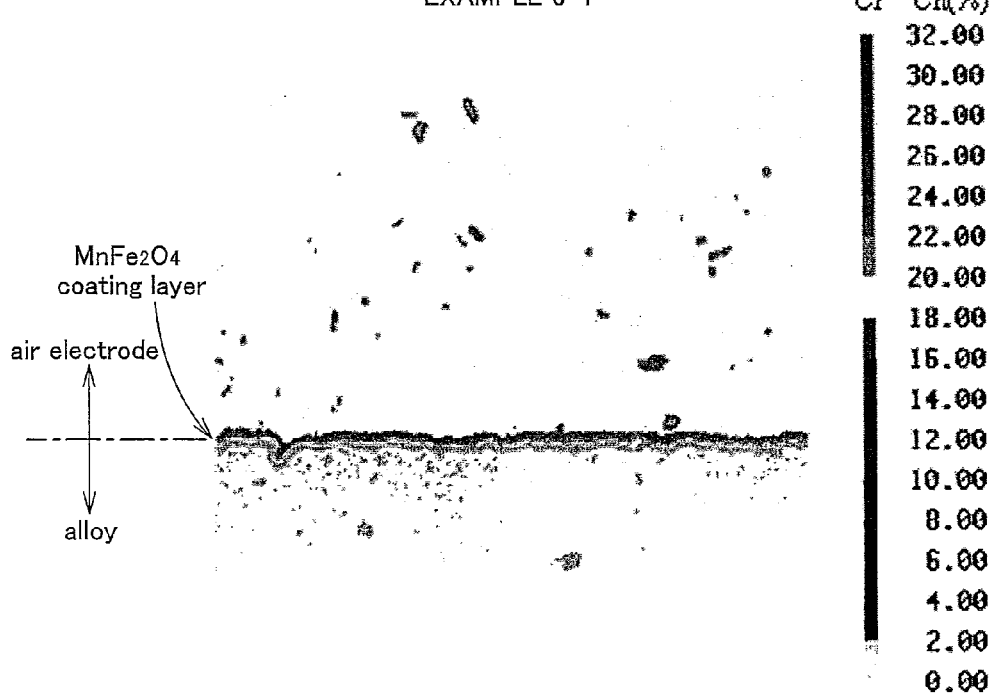

FIG. 12 shows the result of analysis of the Cr distribution of the sintered SOFC cell of EXAMPLE 6-1. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 6-1 having the $MnFe_2O_4$ coating layer on the surface of the alloy, the Cr concentration was about 0% for substantially entire air electrode and little Cr poisoning at the air electrode was found.

Example 6-2

Next, there will be described results of testing in which Cr distributions in the cross section adjacent the bonded portion between the alloy and the air electrode were determined on the SOFC cell (EXAMPLE 6-2) manufactured with forming $MnFe_2O_4$ coating layer by the wet coating layer forming technique on the surfaces (both sides) of the alloy employed in the interconnect or the like, prior to execution of the sintering treatment as done in the above-described sixth embodiment.

For the SOFC cell of the above-described EXAMPLE 6-2, the dipping method was employed as the wet coating layer forming technique for forming the $MnFe_2O_4$ coating layer on the surface of the alloy and thickness of the $MnFe_2O_4$ coating layer was about 5 to 30 μm.

In accordance with the above-described procedure of the effect confirming test, voltage drop at 750° C. in the interconnect (alloy+$MnFe_2O_4$ coating layer) was determined to be 15.9 mV. Incidentally, the electric conductivity of the $MnFe_2O_4$ sintered product was 0.11 S/cm at the 750° C. atmosphere.

Next, for each SOFC cell, the Cr distribution in the cross section adjacent the bonded portion between the alloy and the air electrode was analyzed by EPMA.

Figure 13:
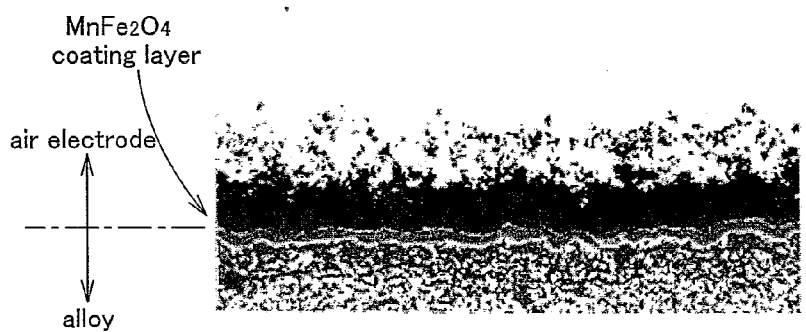

FIG. 13 shows the result of analysis of the Cr distribution of the sintered SOFC cell of EXAMPLE 6-2. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 6-2 having the $MnFe_2O_4$ coating layer on the surface of the alloy, as shown in FIG. 13, the Cr concentration was about 0% for substantially entire air electrode and little Cr poisoning at the air electrode was found.

Seventh Embodiment

In this seventh embodiment, $MnNi_2O_4$ was chosen as a spinel oxide. Prior to execution of sintering treatment, an $MnNi_2O_4$ coating layer was formed at least on the surface of the boundary surface 1a (see FIG. 2) of the interconnect 1 relative to the air electrode 31.

That is, with an SOFC cell C having the $MnNi_2O_4$ coating layer on the boundary surface 1a of the interconnect 1, it is presumed that the equilibrium dissociated oxygen partial pressure of NiO as the first mono metal oxide constituting the $MnNi_2O_4$ coating layer is $2.72 \times 10^{-16}$. On the other hand, the equilibrium dissociated oxygen partial pressure of $MnO_2$ as the second mono metal oxide constituting the $MnNi_2O_4$ coating layer is $9.04 \times 10^{-18}$ atm is lower than the equilibrium dissociated oxygen partial pressure of NiO. Meanwhile, this $MnNi_2O_4$ coating layer has not only good heat resistance, but also a dense structure. Therefore, supply of oxygen steam or the like as an oxidant via this $MnNi_2O_4$ coating layer toward the interconnect 1 is effectively prevented and also migration of Cr(VI) oxide via this $MnNi_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 7-1

Next, there will be described results of testing in which Cr distributions in the cross section adjacent the bonded portion between the alloy and the air electrode were determined on the SOFC cell (EXAMPLE 7-1) manufactured with forming $MnNi_2O_4$ coating layer by the dry coating layer forming technique on the surfaces (one side) of the alloy employed in the interconnect or the like, prior to execution of the sintering treatment as done in the above-described seventh embodiment.

For the SOFC cell of the above-described EXAMPLE 7-1, the sputtering method was employed as the dry coating layer forming technique for forming the $MnNi_2O_4$ coating layer on the surface of the alloy and thickness of the $MnNi_2O_4$ coating layer was about 2 μm.

In accordance with the above-described procedure of the effect confirming test, voltage drop at 750° C. in the interconnect (alloy+$MnNi_2O_4$ coating layer) was determined to be 39.4 mV.

Next, for the SOFC cell, the Cr distribution in the cross section adjacent the bonded portion between the alloy and the air electrode was analyzed by EPMA.

Figure 14:
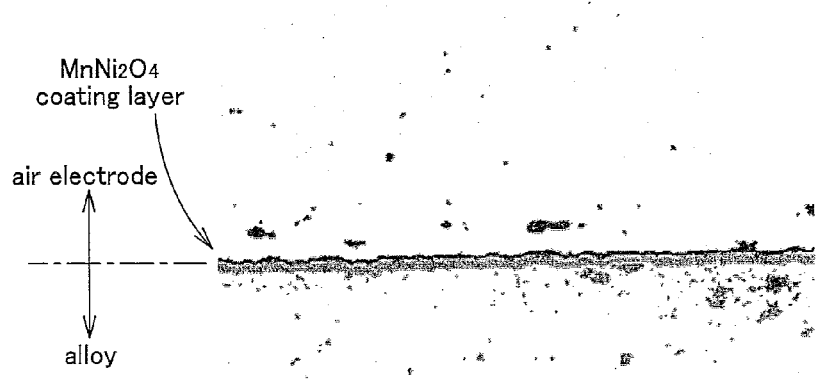

FIG. 14 shows the result of analysis of the Cr distribution of the sintered SOFC cell of EXAMPLE 7-1. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 7-1 having the $MnNi_2O_4$ coating layer on the surface of the alloy, as shown in FIG. 14, the Cr concentration was about 0% for substantially entire air electrode and little Cr poisoning at the air electrode was found.

Example 7-2

Next, there will be described results of testing in which Cr distributions in the cross section adjacent the bonded portion between the alloy and the air electrode were determined on the SOFC cell (EXAMPLE 7-2) manufactured with forming $MnNi_2O_4$ coating layer by the wet coating layer forming technique on the surfaces (both sides) of the alloy employed in the interconnect or the like, prior to execution of the sintering treatment as done in the above-described seventh embodiment.

For the SOFC cell of the above-described EXAMPLE 7-2, the dipping method was employed as the wet coating layer forming technique for forming the $MnNi_2O_4$ coating layer on the surface of the alloy and thickness of the $MnNi_2O_4$ coating layer was about 5 to 30 μm.

In accordance with the above-described procedure of the effect confirming test, voltage drop at 750° C. in the interconnect (alloy+$MnNi_2O_4$ coating layer) was determined to be 20.2 mV. Incidentally, the electric conductivity of the $MnNi_2O_4$ sintered product was 5.47 S/cm at the 750° C. atmosphere.

Next, for each SOFC cell, the Cr distribution in the cross section adjacent the bonded portion between the alloy and the air electrode was analyzed by EPMA.

Figure 15:
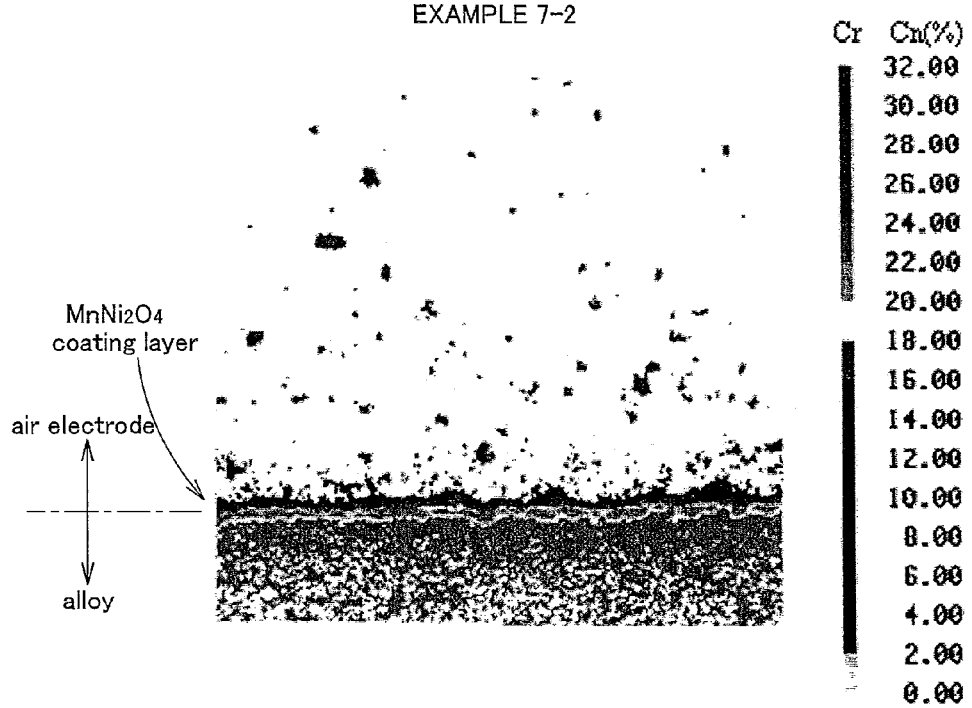

FIG. 15 shows the result of analysis of the Cr distribution of the sintered SOFC cell of EXAMPLE 7-2. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 7-2 having the $MnNi_2O_4$ coating layer on the surface of the alloy, as shown in FIG. 15, the Cr concentration was about 0% for substantially entire air electrode and little Cr poisoning at the air electrode was found.

Eighth Embodiment

In this eighth embodiment, $MnCo_2O_4$ was chosen as a spinel oxide. Prior to execution of sintering treatment, an $MnCo_2O_4$ coating layer was formed at least on the surface of the boundary surface 1a (see FIG. 2) of the interconnect 1 relative to the air electrode 31.

That is, with an SOFC cell C having the $MnCo_2O_4$ coating layer on the boundary surface 1a of the interconnect 1, it is presumed that the equilibrium dissociated oxygen partial pressure of $Co_2O_3$ as the first mono metal oxide constituting the $MnCo_2O_4$ coating layer is $3.44 \times 10^{-13}$, with substitution by the equilibrium dissociated oxygen partial pressure of $Co_3O_4$. On the other hand, the equilibrium dissociated oxygen partial pressure of MnO as the second mono metal oxide constituting the $MnCo_2O_4$ coating layer is $2.38 \times 10^{32}$ atm is lower than the equilibrium dissociated oxygen partial pressure of $Co_2O_3$. Meanwhile, this $MnCo_2O_4$ coating layer has not only good heat resistance, but also a dense structure. Therefore, supply of oxygen steam or the like as an oxidant via this $MnCo_2O_4$ coating layer toward the interconnect 1 is effectively prevented and also migration of Cr (VI) oxide via this $MnCo_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 8

Next, there will be described results of testing in which Cr distributions in the cross section adjacent the bonded portion between the alloy and the air electrode were determined on the SOFC cell (EXAMPLE 8) manufactured with forming $MnCo_2O_4$ coating layer by the wet coating layer forming technique on the surfaces (both sides) of the alloy employed in the interconnect or the like, prior to execution of the sintering treatment as done in the above-described seventh embodiment.

For the SOFC cell of the above-described EXAMPLE 8, the dipping method was employed as the wet coating layer forming technique for forming the $MnCo_2O_4$ coating layer on the surface of the alloy and thickness of the $MnCo_2O_4$ coating layer was about 5 to 30 μm.

In accordance with the above-described procedure of the effect confirming test, voltage drop at 750° C. in the interconnect (alloy+$MnCo_2O_4$ coating layer) was determined to be 15.6 mV. Incidentally, the electric conductivity of the $MnCo_2O_4$ sintered product was 10.1 S/cm at the 750° C. atmosphere.

Next, for the SOFC cell, the Cr distribution in the cross section adjacent the bonded portion between the alloy and the air electrode was analyzed by EPMA.

Figure 16:
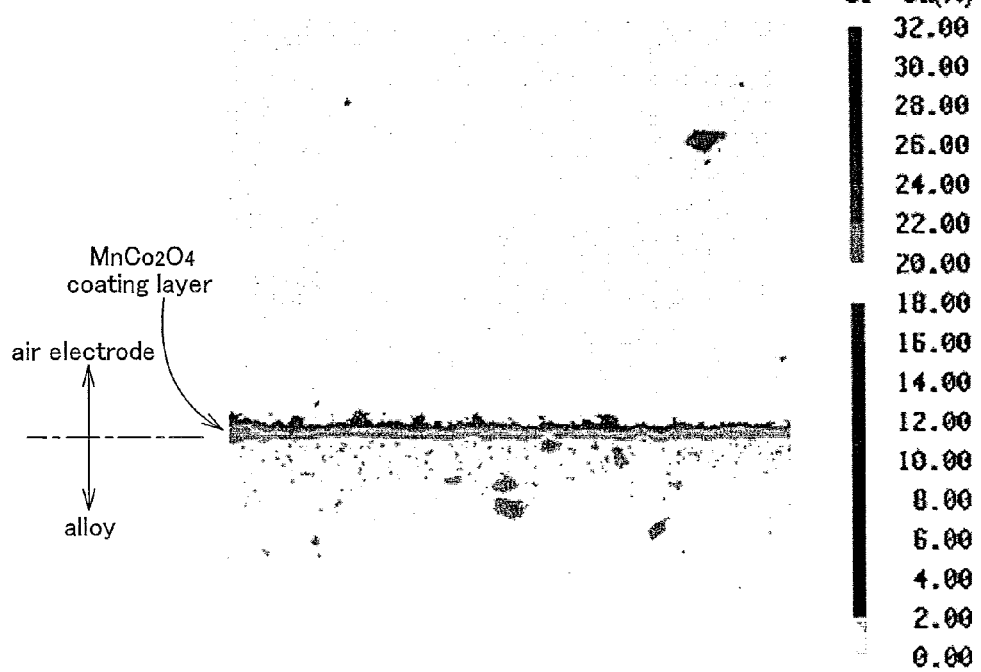

FIG. 16 shows the result of analysis of the Cr distribution of the sintered SOFC cell of EXAMPLE 8. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 8 having the $MnCo_2O_4$ coating layer on the surface of the alloy, as shown in FIG. 16, the Cr concentration was about 0% for substantially entire air electrode and little Cr poisoning at the air electrode was found.

Ninth Embodiment

In this ninth embodiment, $Mn(Mn_{0.25}Cu_{0.75})_2O_4$ was chosen as a spinel oxide. Prior to execution of sintering treatment, an $Mn(Mn_{0.25}Cu_{0.75})_2O_4$ coating layer was formed at least on the surface of the boundary surface 1a (see FIG. 2) of the interconnect 1 relative to the air electrode 31.

That is, with an SOFC cell C having the $Mn(Mn_{0.25}Cu_{0.75})_2O_4$ coating layer on the boundary surface 1a of the interconnect 1, it is presumed that the equilibrium dissociated oxygen partial pressure of $Co_2O_3$ as the first mono metal oxide constituting the $MnCo_2O_4$ coating layer is $3.44 \times 10^{-13}$, with substitution by the equilibrium dissociated oxygen partial pressure of $Co_3O_4$. On the other hand, the equilibrium dissociated oxygen partial pressure of MnO as the second mono metal oxide constituting the $Mn(Mn_{0.25}Cu_{0.75})_2O_4$ coating layer is $2.38 \times 10^{-32}$ atm is lower than the equilibrium dissociated oxygen partial pressure of $Co_2O_3$. Meanwhile, this $Mn(Mn_{0.25}Cu_{0.75})_2O_4$ coating layer has not only good heat resistance, but also a dense structure. Therefore, supply of oxygen steam or the like as an oxidant via this $Mn(Mn_{0.25}Cu_{0.75})_2O_4$ coating layer toward the interconnect 1 is effectively prevented and also migration of Cr (VI) oxide via this $Mn(Mn_{0.25}Cu_{0.75})_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 9

Next, there will be described results of testing in which Cr distributions in the cross section adjacent the bonded portion between the alloy and the air electrode were determined on the SOFC cell (EXAMPLE 9) manufactured with forming $Mn(Mn_{0.25}Cu_{0.75})_2O_4$ coating layer by the wet coating layer forming technique on the surfaces (both sides) of the alloy employed in the interconnect or the like, prior to execution of the sintering treatment as done in the above-described ninth embodiment.

For the SOFC cell of the above-described EXAMPLE 9, the dipping method was employed as the wet coating layer forming technique for forming the $Mn(Mn_{0.25}Cu_{0.75})_2O_4$ coating layer on the surface of the alloy and thickness of the $Mn(Mn_{0.25}Cu_{0.75})_2O_4$ coating layer was about 5 to 30 μm.

In accordance with the above-described procedure of the effect confirming test, voltage drop at 750° C. in the interconnect (alloy+$Mn(Mn_{0.25}Cu_{0.75})_2O_4$ coating layer) was determined to be 24.3 mV. Incidentally, the electric conductivity of the $Mn(Mn_{0.25}Co_{0.75})_2O_4$ sintered product was 35.6 S/cm at the 750° C. atmosphere.

Next, for the SOFC cell, the Cr distribution in the cross section adjacent the bonded portion between the alloy and the air electrode was analyzed by EPMA.

FIG. 17 shows the result of analysis of the Cr distribution of the sintered SOFC cell of EXAMPLE 9. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 9 having the $Mn(Mn_{0.25}Cu_{0.75})_2O_4$ coating layer on the surface of the alloy, as shown in FIG. 17, the Cr concentration was about 0% for substantially entire air electrode and little Cr poisoning at the air electrode was found.

Tenth Embodiment

In this tenth embodiment, $(Mn_{0.5}Cu_{0.5})Co_2O_4$ was chosen as a spinel oxide. Prior to execution of sintering treatment, an $(Mn_{0.5}Cu_{0.5})Co_2O_4$ coating layer was formed at least on the surface of the boundary surface 1a (see FIG. 2) of the interconnect 1 relative to the air electrode 31.

That is, with an SOFC cell C having the $(Mn_{0.5}Cu_{0.5})Co_2O_4$ coating layer on the boundary surface 1a of the interconnect 1, it is presumed that the equilibrium dissociated oxygen partial pressure of $Co_2O_3$ as the first mono metal oxide constituting the $(Mn_{0.5}Cu_{0.5})CO_2O_4$ coating layer is $3.44 \times 10^{-13}$. On the other hand, the equilibrium dissociated oxygen partial pressure of MnO as the second mono metal oxide constituting the $(Mn_{0.5}Co_{0.5})Co_2O_4$ coating layer is $2.38 \times 10^{-32}$ atm is lower than the equilibrium dissociated oxygen partial pressure of $Co_2O_3$. Meanwhile, this $(Mn_{0.5}Cu_{0.5})Co_2O_4$ coating layer has not only good heat resistance, but also a dense structure. Therefore, supply of oxygen steam or the like as an oxidant via this $(Mn_{0.5}Cu_{0.5})Co_2O_4$ coating layer toward the interconnect 1 is effectively prevented and also migration of Cr (VI) oxide via this $(Mn_{0.5}Cu_{0.5})Co_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 10

Next, there will be described results of testing in which Cr distributions in the cross section adjacent the bonded portion between the alloy and the air electrode were determined on the SOFC cell (EXAMPLE 10) manufactured with forming $(Mn_{0.5}Cu_{0.5})Co_2O_4$ coating layer by the wet coating layer forming technique on the surfaces (both sides) of the alloy employed in the interconnect or the like, prior to execution of the sintering treatment as done in the above-described tenth embodiment.

For the SOFC cell of the above-described EXAMPLE 10, the dipping method was employed as the wet coating layer forming technique for forming the $(Mn_{0.5}Cu_{0.5})Co_2O_4$ coating layer on the surface of the alloy and thickness of the $(Mn_{0.5}Co_{0.5})CO_2O_4$ coating layer was about 5 to 30 μm.

In accordance with the above-described procedure of the effect confirming test, voltage drop at 750° C. in the interconnect (alloy+$Mn(Mn_{0.5}Cu_{0.5})Co_2O_4$ coating layer) was determined to be 24.3 mV. Incidentally, the electric conductivity of the $(Mn_{0.5}Co_{0.5})Co_2O_4$ sintered product was 35.6 S/cm at the 750° C. atmosphere.

Next, for the SOFC cell, the Cr distribution in the cross section adjacent the bonded portion between the alloy and the air electrode was analyzed by EPMA.

FIG. 18 shows the result of analysis of the Cr distribution of the sintered SOFC cell of EXAMPLE 10. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 10 having the $(Mn_{0.5}Cu_{0.5})Co_2O_4$ coating layer on the surface of the alloy, as shown in FIG. 18, the Cr concentration was about 0% for substantially entire air electrode and little Cr poisoning at the air electrode was found.

Eleventh Embodiment

In this eleventh embodiment, $TiCo_2O_4$ was chosen as a spinel oxide. Prior to execution of sintering treatment, a $TiCo_2O_4$ coating layer was formed at least on the surface of the boundary surface 1a (see FIG. 2) of the interconnect 1 relative to the air electrode 31.

That is, with an SOFC cell C having the $TiCo_2O_4$ coating layer on the boundary surface 1a of the interconnect 1, it is presumed that the equilibrium dissociated oxygen partial pressure of CoO as the first mono metal oxide constituting the $TiCo_2O_4$ coating layer is $2.90 \times 10^{-17}$. On the other hand, the equilibrium dissociated oxygen partial pressure of $TiO_2$ as the second mono metal oxide constituting the $TiCo_2O_4$ coating layer is $1.86 \times 10^{-39}$ atm is lower than the equilibrium dissociated oxygen partial pressure of CoO. Meanwhile, this $TiCo_2O_4$ coating layer has not only good heat resistance, but also a dense structure. Therefore, supply of oxygen steam or the like as an oxidant via this $TiCo_2O_4$ coating layer toward the interconnect 1 is effectively prevented and also migration of Cr (VI) oxide via this $TiCo_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 11

Next, there will be described results of testing in which Cr distributions in the cross section adjacent the bonded portion between the alloy and the air electrode were determined on the SOFC cell (EXAMPLE 10) manufactured with forming $(Mn_{0.5}Cu_{0.5})Co_2O_4$ coating layer by the wet coating layer forming technique on the surfaces (both sides) of the alloy employed in the interconnect or the like, prior to execution of the sintering treatment as done in the above-described eleventh embodiment.

For the SOFC cell of the above-described EXAMPLE 11, the dipping method was employed as the wet coating layer forming technique for forming the $TiCo_2O_4$ coating layer on the surface of the alloy and thickness of the $TiCo_2O_4$ coating layer was about 5 to 30 μm.

In accordance with the above-described procedure of the effect confirming test, voltage drop at 750° C. in the interconnect (alloy+$TiCo_2O_4$ coating layer) was determined to be 63.8 mV. Incidentally, the electric conductivity of the $TiCo_2O_4$ sintered product was 0.17 S/cm at the 750° C. atmosphere.

Next, for the SOFC cell, the Cr distribution in the cross section adjacent the bonded portion between the alloy and the air electrode was analyzed by EPMA.

Figure 19:
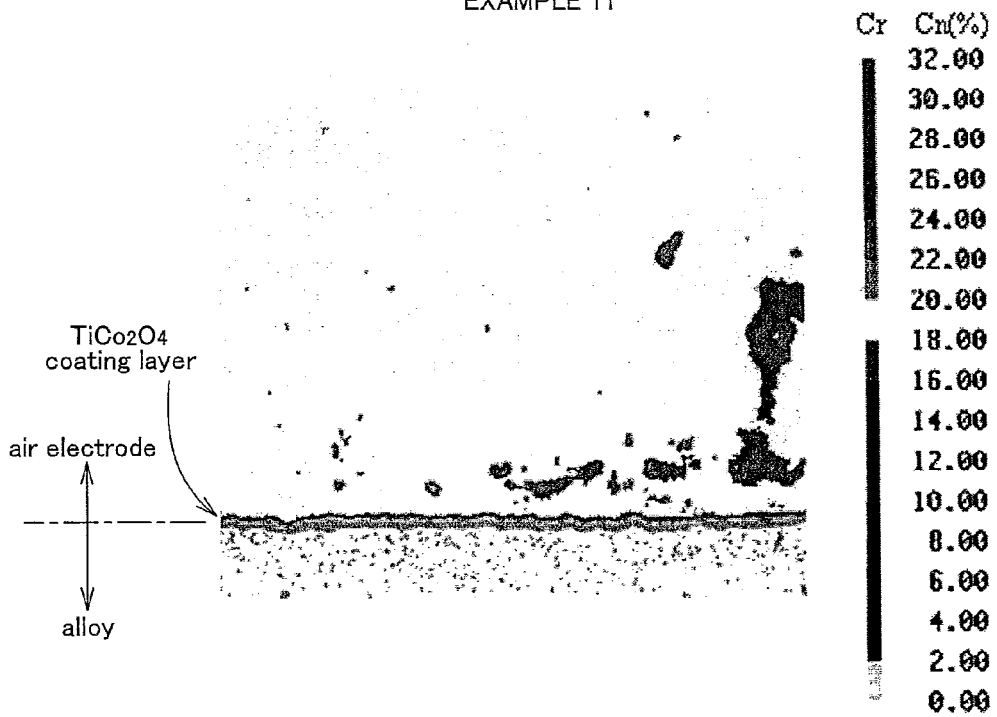

FIG. 19 shows the result of analysis of the Cr distribution of the sintered SOFC cell of EXAMPLE 11. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 11 having the $TiCo_2O_4$ coating layer on the surface of the alloy, as shown in FIG. 19, the Cr concentration was about 0% for substantially entire air electrode and little Cr poisoning at the air electrode was found.

Twelfth Embodiment

In this twelfth embodiment, $ZnFe_2O_4$ was chosen as a spinel oxide. Prior to execution of sintering treatment, a $ZnFe_2O_4$ coating layer was formed at least on the surface of the boundary surface 1a (see FIG. 2) of the interconnect 1 relative to the air electrode 31.

That is, with an SOFC cell C having the $ZnFe_2O_4$ coating layer on the boundary surface 1a of the interconnect 1, it is presumed that the equilibrium dissociated oxygen partial pressure of $Fe_2O_3$ as the first mono metal oxide constituting the $ZnFe_2O_4$ coating layer is $1.31 \times 10^{-19}$. On the other hand, the equilibrium dissociated oxygen partial pressure of ZnO as the second mono metal oxide constituting the $ZnFe_2O_4$ coating layer is $5.94 \times 10^{-26}$ atm is lower than the equilibrium dissociated oxygen partial pressure of $Fe_2O_3$. Meanwhile, this $ZnFe_2O_4$ coating layer has not only good heat resistance, but also a dense structure. Therefore, supply of oxygen steam or the like as an oxidant via this $ZnFe_2O_4$ coating layer toward the interconnect 1 is effectively prevented and also migration of Cr (VI) oxide via this $ZnFe_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 12

Next, there will be described results of testing in which Cr distributions in the cross section adjacent the bonded portion between the alloy and the air electrode were determined on the SOFC cell (EXAMPLE 12) manufactured with forming $ZnFe_2O_4$ coating layer by the wet coating layer forming technique on the surfaces (both sides) of the alloy employed in the interconnect or the like, prior to execution of the sintering treatment as done in the above-described twelfth embodiment.

For the SOFC cell of the above-described EXAMPLE 12, the dipping method was employed as the wet coating layer forming technique for forming the $TiCo_2O_4$ coating layer on the surface of the alloy and thickness of the $TiCo_2O_4$ coating layer was about 5 to 30 μm.

In accordance with the above-described procedure of the effect confirming test, voltage drop at 750° C. in the interconnect (alloy+$ZnFe_2O_4$ coating layer) was determined to be 34.2 mV. Incidentally, the electric conductivity of the $ZnFe_2O_4$ sintered product was 0.21 S/cm at the 750° C. atmosphere.

Next, for the SOFC cell, the Cr distribution in the cross section adjacent the bonded portion between the alloy and the air electrode was analyzed by EPMA.

Figure 20:
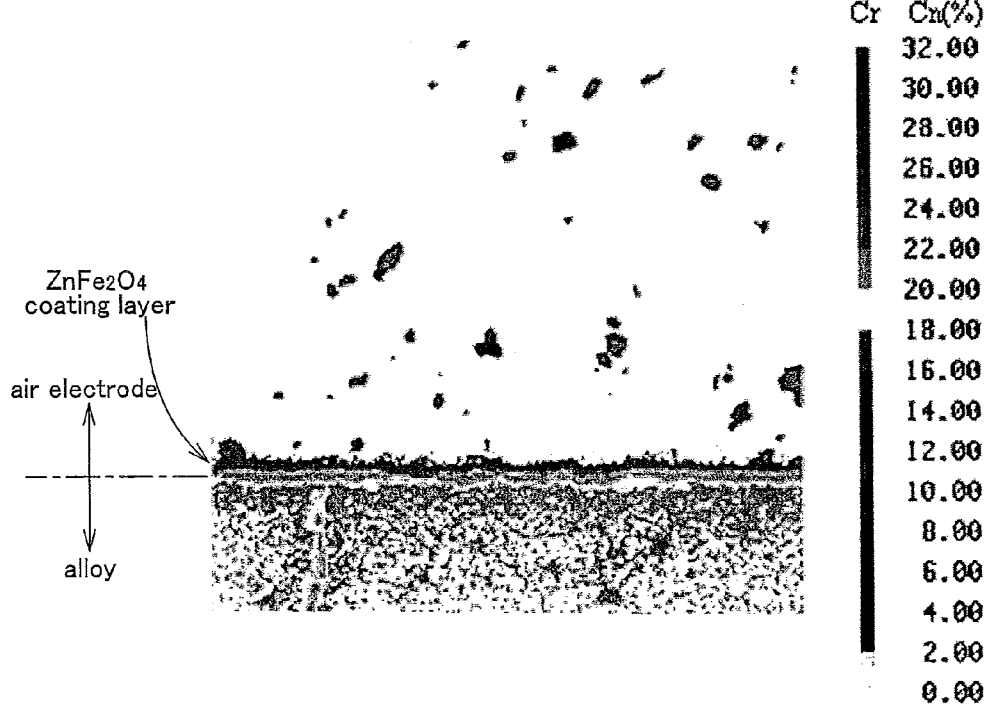

FIG. 20 shows the result of analysis of the Cr distribution of the sintered SOFC cell of EXAMPLE 12. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 12 having the $ZnFe_2O_4$ coating layer on the surface of the alloy, as shown in FIG. 20, the Cr concentration was about 0% for substantially entire air electrode and little Cr poisoning at the air electrode was found.

Thirteenth Embodiment

In this thirteenth embodiment, $FeCo_2O_4$ was chosen as a spinel oxide. Prior to execution of sintering treatment, an $FeCo_2O_4$ coating layer was formed at least on the surface of the boundary surface 1a (see FIG. 2) of the interconnect 1 relative to the air electrode 31.

That is, with an SOFC cell C having the $FeCo_2O_4$ coating layer on the boundary surface 1a of the interconnect 1, it is presumed that the equilibrium dissociated oxygen partial pressure of $Co_2O_3$ as the first mono metal oxide constituting the $FeCo_2O_4$ coating layer is $3.44 \times 10^{-13}$, with substitution by the equilibrium dissociated oxygen partial pressure of $Co_3O_4$. On the other hand, the equilibrium dissociated oxygen partial pressure of FeO as the second mono metal oxide constituting the $FeCo_2O_4$ coating layer is $6.20 \times 10^{-21}$ atm is lower than the equilibrium dissociated oxygen partial pressure of $Co_3O_4$. Meanwhile, this $FeCo_2O_4$ coating layer has not only good heat resistance, but also a dense structure. Therefore, supply of oxygen steam or the like as an oxidant via this $FeCo_2O_4$ coating layer toward the interconnect 1 is effectively prevented and also migration of Cr (VI) oxide via this $FeCo_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 13

Next, there will be described results of testing in which Cr distributions in the cross section adjacent the bonded portion between the alloy and the air electrode were determined on the SOFC cell (EXAMPLE 13) manufactured with forming $FeCo_2O_4$ coating layer by the wet coating layer forming technique on the surfaces (both sides) of the alloy employed in the interconnect or the like, prior to execution of the sintering treatment as done in the above-described thirteenth embodiment.

For the SOFC cell of the above-described EXAMPLE 13, the dipping method was employed as the wet coating layer forming technique for forming the $FeCo_2O_4$ coating layer on the surface of the alloy and thickness of the $FeCo_2O_4$ coating layer was about 5 to 30 μm.

In accordance with the above-described procedure of the effect confirming test, voltage drop at 750° C. in the interconnect (alloy+$FeCo_2O_4$ coating layer) was determined to be 13.8 mV. Incidentally, the electric conductivity of the $FeCo_2O_4$ sintered product was 2.36 S/cm at the 750° C. atmosphere.

Next, for each SOFC cell, the Cr distribution in the cross section adjacent the bonded portion between the alloy and the air electrode was analyzed by EPMA.

FIG. 21 shows the result of analysis of the Cr distribution of the sintered SOFC cell of EXAMPLE 13. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 13 having the $FeCo_2O_4$ coating layer on the surface of the alloy, as shown in FIG. 21, the Cr concentration was about 0% for substantially entire air electrode and little Cr poisoning at the air electrode was found.

Fourteenth Embodiment

In this fourteenth embodiment, $CoFe_2O_4$ was chosen as a spinel oxide. Prior to execution of sintering treatment, a $CoFe_2O_4$ coating layer was formed at least on the surface of the boundary surface 1a (see FIG. 2) of the interconnect 1 relative to the air electrode 31.

That is, with an SOFC cell C having the $CoFe_2O_4$ coating layer on the boundary surface 1a of the interconnect 1, it is presumed that the equilibrium dissociated oxygen partial pressure of $Co_2O_3$ as the first mono metal oxide constituting the $CoFe_2O_4$ coating layer is $3.44 \times 10^{-13}$, with substitution by the equilibrium dissociated oxygen partial pressure of $Co_3O_4$. On the other hand, the equilibrium dissociated oxygen partial pressure of FeO as the second mono metal oxide constituting the $CoFe_2O_4$ coating layer is $6.20 \times 10^{21}$ atm is lower than the equilibrium dissociated oxygen partial pressure of $Co_2O_3$. Meanwhile, this $CoFe_2O_4$ coating layer has not only good heat resistance, but also a dense structure. Therefore, supply of oxygen steam or the like as an oxidant via this $CoFe_2O_4$ coating layer toward the interconnect 1 is effectively prevented and also migration of Cr (VI) oxide via this $CoFe_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 14

Next, there will be described results of testing in which Cr distributions in the cross section adjacent the bonded portion between the alloy and the air electrode were determined on the SOFC cell (EXAMPLE 14) manufactured with forming $CoFe_2O_4$ coating layer by the wet coating layer forming technique on the surfaces (both sides) of the alloy employed in the interconnect or the like, prior to execution of the sintering treatment as done in the above-described fourteenth embodiment.

For the SOFC cell of the above-described EXAMPLE 14, the dipping method was employed as the wet coating layer forming technique for forming the $CoFe_2O_4$ coating layer on the surface of the alloy and thickness of the $CoFe_2O_4$ coating layer was about 5 to 30 μm.

In accordance with the above-described procedure of the effect confirming test, voltage drop at 750° C. in the interconnect (alloy+$CoFe_2O_4$ coating layer) was determined to be 25.2 mV. Incidentally, the electric conductivity of the $CoFe_2O_4$ sintered product was 0.21 S/cm at the 750° C. atmosphere.

Next, for the SOFC cell, the Cr distribution in the cross section adjacent the bonded portion between the alloy and the air electrode was analyzed by EPMA.

FIG. 22 shows the result of analysis of the Cr distribution of the sintered SOFC cell of EXAMPLE 14. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 14 having the $CoFe_2O_4$ coating layer on the surface of the alloy, as shown in FIG. 22, the Cr concentration was about 0% for substantially entire air electrode and little Cr poisoning at the air electrode was found.

Fifteenth Embodiment

In this fifteenth embodiment, $MgCo_2O_4$ was chosen as a spinel oxide. Prior to execution of sintering treatment, an $MgCo_2O_4$ coating layer was formed at least on the surface of the boundary surface 1a (see FIG. 2) of the interconnect 1 relative to the air electrode 31.

That is, with an SOFC cell C having the $MgCo_2O_4$ coating layer on the boundary surface 1a of the interconnect 1, it is presumed that the equilibrium dissociated oxygen partial pressure of $Co_2O_3$ as the first mono metal oxide constituting the $MgCo_2O_4$ coating layer is $3.44 \times 10^{13}$, with substitution by the equilibrium dissociated oxygen partial pressure of $Co_3O_4$. On the other hand, the equilibrium dissociated oxygen partial pressure of MgO as the second mono metal oxide constituting the $MgCo_2O_4$ coating layer is $7.96 \times 10^{51}$ atm is lower than the equilibrium dissociated oxygen partial pressure of $Co_2O_3$. Meanwhile, this $MgCo_2O_4$ coating layer has not only good heat resistance, but also a dense structure. Therefore, supply of oxygen steam or the like as an oxidant via this $MgCo_2O_4$ coating layer toward the interconnect 1 is effectively prevented and also migration of Cr (VI) oxide via this $MgCo_2O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 15

Next, there will be described results of testing in which Cr distributions in the cross section adjacent the bonded portion between the alloy and the air electrode were determined on the SOFC cell manufactured with forming $MgCo_2O_4$ coating layer by the wet coating layer forming technique on the surfaces (both sides) of the alloy employed in the interconnect or the like, prior to execution of the sintering treatment as done in the above-described fifteenth embodiment.

For the SOFC cell of the above-described EXAMPLE 15, the dipping method was employed as the wet coating layer forming technique for forming the $MgCo_2O_4$ coating layer on the surface of the alloy and thickness of the $MgCo_2O_4$ coating layer was about 5 to 30 μm.

In accordance with the above-described procedure of the effect confirming test, voltage drop at 750° C. in the interconnect (alloy+$MgCo_2O_4$ coating layer) was determined to be 18.5 mV. Incidentally, the electric conductivity of the $MgCo_2O_4$ sintered product was 0.46 S/cm at the 750° C. atmosphere.

Next, for the SOFC cell, the Cr distribution in the cross section adjacent the bonded portion between the alloy and the air electrode was analyzed by EPMA.

Figure 23:

FIG. 23 shows the result of analysis of the Cr distribution of the sintered SOFC cell of EXAMPLE 15. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 15 having the $MgCo_2O_4$ coating layer on the surface of the alloy, as shown in FIG. 23, the Cr concentration was about 0% for substantially entire air electrode and little Cr poisoning at the air electrode was found.

Sixteenth Embodiment

In this sixteenth embodiment, $Co_3O_4$ was chosen as a spinel oxide. Prior to execution of sintering treatment, a $Co_3O_4$ coating layer was formed at least on the surface of the boundary surface 1a (see FIG. 2) of the interconnect 1 relative to the air electrode 31.

That is, with an SOFC cell C having the $Co_3O_4$ coating layer on the boundary surface 1a of the interconnect 1, it is presumed that the equilibrium dissociated oxygen partial pressure of $Co_2O_3$ as the first mono metal oxide constituting the $Co_3O_4$ coating layer is $3.44\times10^{-13}$, with substitution by the equilibrium dissociated oxygen partial pressure of $Co_3O_4$. On the other hand, the equilibrium dissociated oxygen partial pressure of MgO as the second mono metal oxide constituting the $Co_3O_4$ coating layer is $7.96\times10^{-51}$ atm is lower than the equilibrium dissociated oxygen partial pressure of $Co_3O_4$. Meanwhile, this $Co_3O_4$ coating layer has not only good heat resistance, but also a dense structure. Therefore, supply of oxygen steam or the like as an oxidant via this $Co_3O_4$ coating layer toward the interconnect 1 is effectively prevented and also migration of Cr (VI) oxide via this $Co_3O_4$ coating layer toward the air electrode 31 is effectively prevented. Consequently, even when the interconnect 1 is exposed to high temperatures during its manufacturing process, the sintering treatment or during the operation, Cr poisoning of the air electrode 31 can be effectively restricted.

Example 16-1

Next, there will be described results of testing in which Cr distributions in the cross section adjacent the bonded portion between the alloy and the air electrode were determined on the SOFC cell manufactured with forming $Co_3O_4$ coating layer by the wet coating layer forming technique on the surfaces (both sides) of the alloy employed in the interconnect or the like, prior to execution of the sintering treatment as done in the above-described sixteenth embodiment.

For the SOFC cell of the above-described EXAMPLE 16-1, the dipping method was employed as the wet coating layer forming technique for forming the $Co_3O_4$ coating layer on the surface of the alloy and thickness of the $Co_3O_4$ coating layer was about 5 to 30 μm.

In accordance with the above-described procedure of the effect confirming test, voltage drop at 750° C. in the interconnect (alloy+$Co_3O_4$ coating layer) was determined to be 18.5 mV. Incidentally, the electric conductivity of the $Co_3O_4$ sintered product was 0.46 S/cm at the 750° C. atmosphere.

Next, for the SOFC cell, the Cr distribution in the cross section adjacent the bonded portion between the alloy and the air electrode was analyzed by EPMA.

Figure 24:

FIG. 24 shows the result of analysis of the Cr distribution of the sintered SOFC cell of EXAMPLE 16-1. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 16-1 having the $Co_3O_4$ coating layer on the surface of the alloy, as shown in FIG. 24, the Cr concentration was about 0% for substantially entire air electrode and little Cr poisoning at the air electrode was found.

Example 16-2

Figure 36:
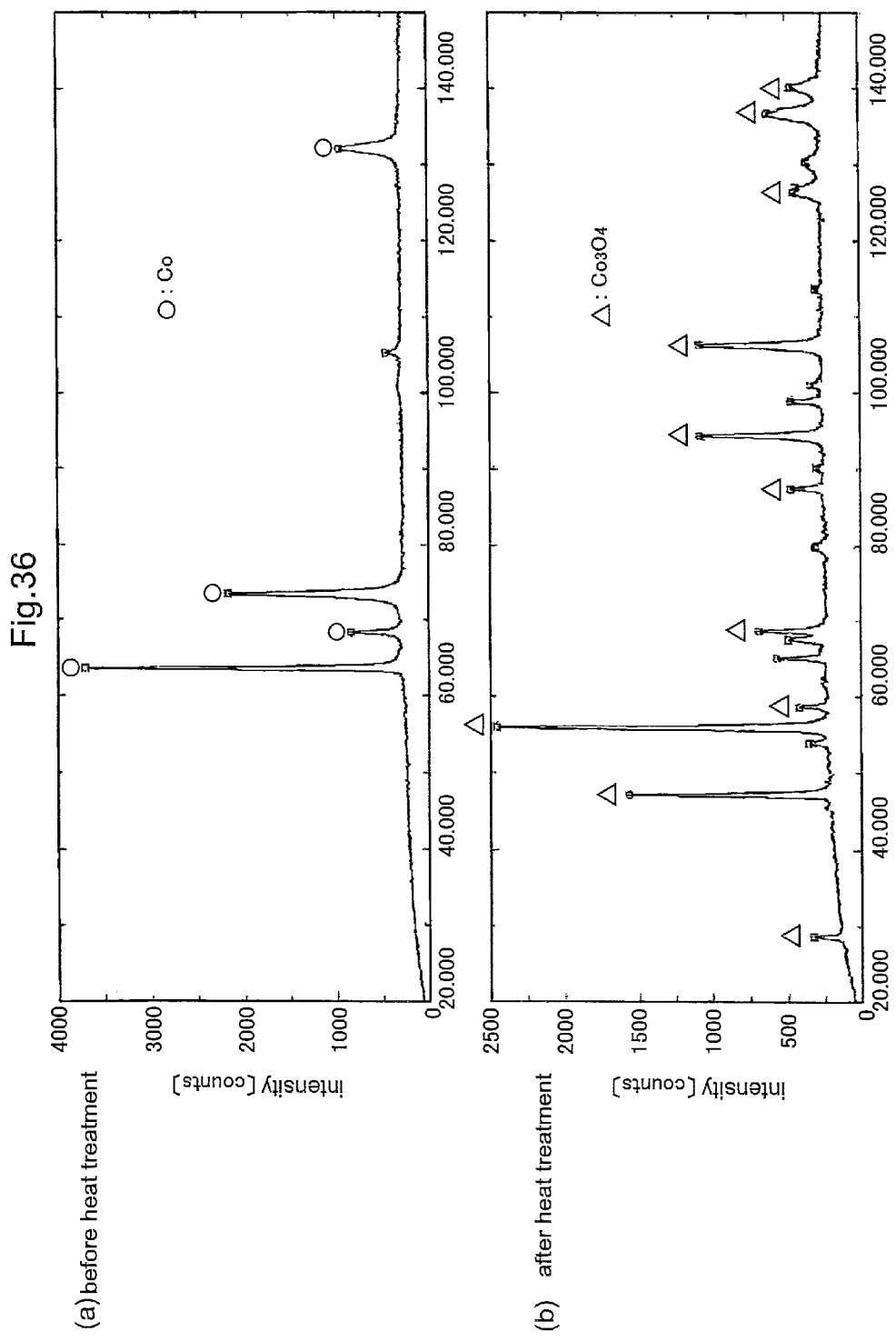

Prior to the execution of a sintering treatment as in the sixteenth embodiment described above, metal Co was formed by means of electroless plating on the surface (both sides) of an alloy to be used in an interconnect or the like. Then, an oxidizing treatment was effected for one hour at 800° C. in the atmosphere. FIG. 36 shows the result of phase identification by X-ray diffraction of the electroless plating layer on the surface after the oxidizing treatment. From this figure, it may be understood that the oxidized surface layer changed from the metal state Co to $Co_3O_4$.

Next, there will be described result of testing conduced on the SOFC cell manufactured with forming the $Co_3O_4$ coating layer by the treatments described above for observing Cr distribution in the cross section adjacent the bonded portion between the alloy and the air electrode.

For the SOFC cell of the above-described EXAMPLE 16-2, as the method of forming the $Co_3O_4$ coating layer, there were employed the method of effecting electroless plating and then effecting an oxidizing treatment in the atmosphere, and thickness of the $Co_3O_4$ coating layer was about 3 to 20 μm.

In accordance with the above-described procedure of the effect confirming test, voltage drop at 750° C. in the interconnect (alloy+$Co_3O_4$ coating layer) was determined to be 18.5 mV. Incidentally, the electric conductivity of the $Co_3O_4$ sintered product was 3.93 S/cm at the 750° C. atmosphere.

Next, for the SOFC cell, the Cr distribution in the cross section adjacent the bonded portion between the alloy and the air electrode was analyzed by EPMA.

Figure 25:
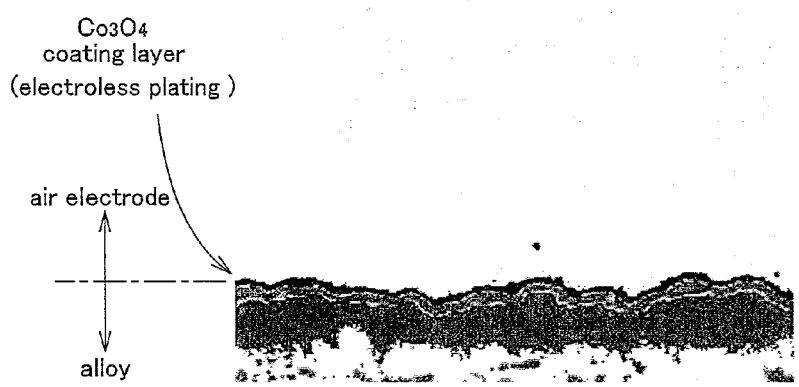

FIG. 25 shows the result of analysis of the Cr distribution of the sintered SOFC cell of EXAMPLE 16-2. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 16-2 having the $Co_3O_4$ coating layer on the surface of the alloy, as shown in FIG. 25, the Cr concentration was about 0% for substantially entire air electrode and little Cr poisoning at the air electrode was found.

Example 16-3

Prior to the execution of a sintering treatment as in the sixteenth embodiment described above, metal Co was formed by means of electroless plating on the surface (both sides) of an alloy to be used in an interconnect or the like. Then, an oxidizing treatment was effected for one hour at 800° C. in the atmosphere.

Next, there will be described result of testing conduced on the SOFC cell manufactured with forming the $Co_3O_4$ coating layer by the treatments described above for observing Cr distribution in the cross section adjacent the bonded portion between the alloy and the air electrode.

For the SOFC cell of the above-described EXAMPLE 16-3, as the method of forming the $Co_3O_4$ coating layer, there were employed the method of effecting electroless plating and then effecting an oxidizing treatment in the atmosphere, and thickness of the $Co_3O_4$ coating layer was about 3 to 20 μm.

In accordance with the above-described procedure of the effect confirming test, voltage drop at 750° C. in the interconnect (alloy+$Co_3O_4$ coating layer) was determined to be 23.1 mV. Incidentally, the electric conductivity of the $Co_3O_4$ sintered product was 3.93 S/cm at the 750° C. atmosphere.

Next, for the SOFC cell, the Cr distribution in the cross section adjacent the bonded portion between the alloy and the air electrode was analyzed by EPMA.

Figure 26:
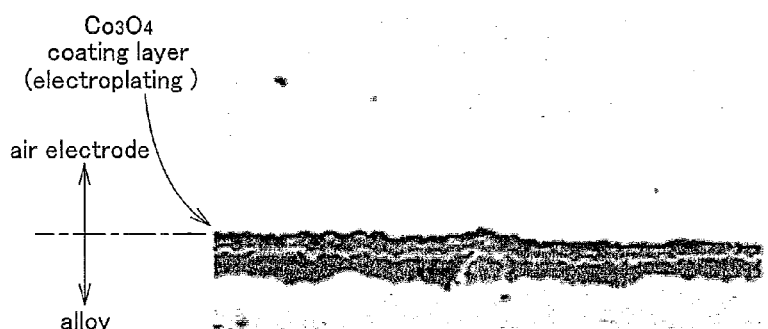

FIG. 26 shows the result of analysis of the Cr distribution of the sintered SOFC cell of EXAMPLE 16-3. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 16-3 having the $Co_3O_4$ coating layer on the surface of the alloy, as shown in FIG. 26, the Cr concentration was about 0% for substantially entire air electrode and little Cr poisoning at the air electrode was found.

[Durability Evaluation Test]

Next, on the spinel oxide coating layers that have been determined as having no occurrence of Cr poisoning at the air electrode based on the above-described EPMA analysis results, durability evaluation test was conducted in order to investigate further durability. This durability evaluation test was conducted respectively on the $ZnCo_2O_4$ coating layer, the $CoMn_2O_4$ coating layer, the $(Zn_{0.45}Cu_{0.55})Co_2O_4$ coating layer, the $Mn(Mn_{0.25}Cu_{0.75})_2O_4$ coating layer, and the $Co_3O_4$ coating layer as representative examples of the corresponding spinel oxide coating layers. In the meantime, these durability evaluation tests will be referred to as EXAMPLE 17 ($ZnCo_2O_4$ coating layer), EXAMPLE 18 ($CoMn_2O_4$ coating layer), EXAMPLE 19 (($Zn_{0.45}Cu_{0.55})Co_2O_4$ coating layer), EXAMPLE 20 ($Mn(Mn_{0.25}Co_{0.75})_2O_4$ coating layer), and EXAMPLE 21 ($Co_3O_4$ coating layer), respectively.

Example 17

In the SOFC cell, $ZnCo_2O_4$ coating layer was formed by the dipping method on the surface (both sides) of the alloy. Then, the resultant SOFC cell formed with this $ZnCo_2O_4$ coating layer was subjected to baking of the air electrode and then retained for 135 hours in 950° C. atmosphere which had been humidified to obtain humidity ranging from 10 to 20%. Thereafter, for this SOFC cell after this 135 hours of retention, the Cr distribution in the cross section adjacent the bonded portion between the alloy and the air electrode was analyzed by EPMA.

Figure 27:
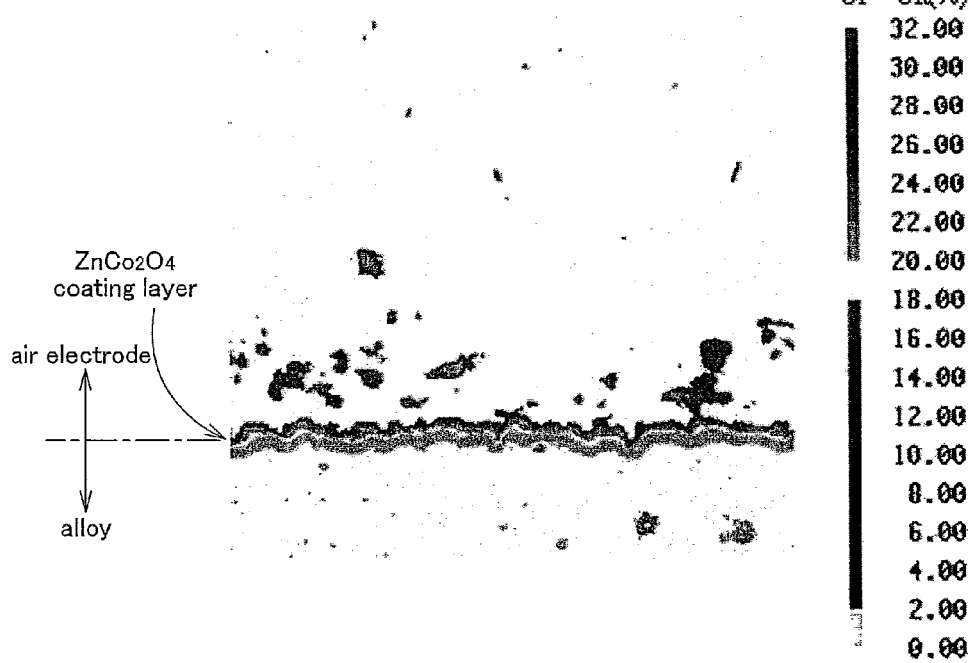

FIG. 27 shows the result of analysis of the Cr distribution of the sintered SOFC cell after the durability evaluation test of EXAMPLE 17. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 17 having the $ZnCo_2O_4$ coating layer on the surface of the alloy, as shown in FIG. 27, the Cr concentration was restricted low for most part of the air electrode and Cr poisoning at the air electrode was practically non-problematic level. Then, the $ZnCo_2O_4$ coating layer of EXAMPLE 17 has practically sufficient durability.

Example 18

In the SOFC cell, $CoMn_2O_4$ coating layer was formed by the sputtering method on the surface (one side) of the alloy. Then, the resultant SOFC cell formed with this $CoMn_2O_4$ coating layer was subjected to baking of the air electrode and then retained for 300 hours in 900° C. atmosphere which had been humidified to obtain humidity ranging from 10 to 20%. Thereafter, for this SOFC cell after this 300 hours of retention, the Cr distribution in the cross section adjacent the bonded portion between the alloy and the air electrode was analyzed by EPMA.

Figure 28:
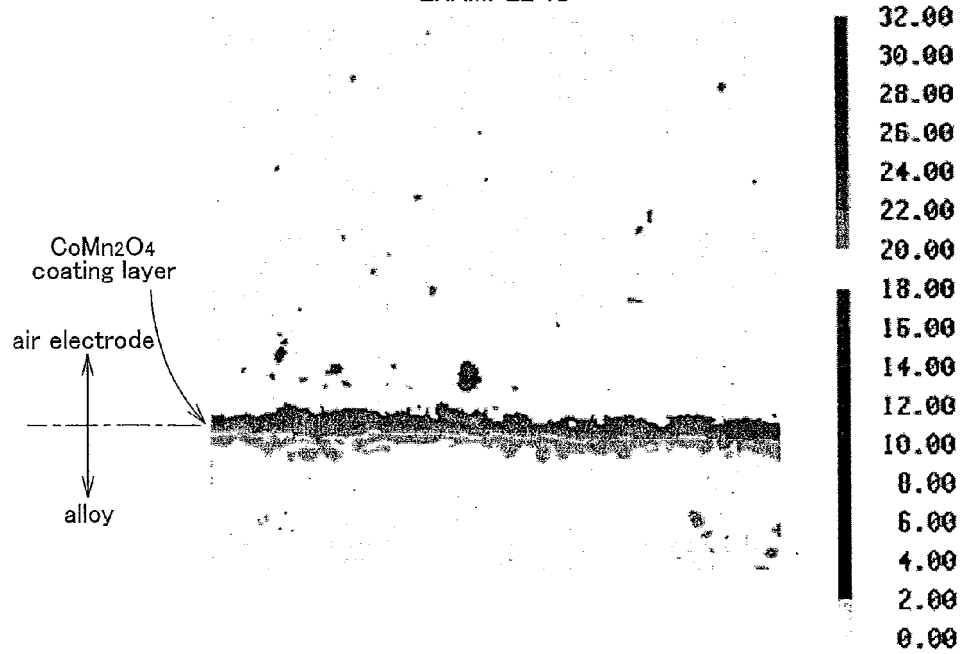

FIG. 28 shows the result of analysis of the Cr distribution of the sintered SOFC cell after the durability evaluation test of EXAMPLE 18. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 μm.

As the results of these tests, in the SOFC cell according to EXAMPLE 18 having the $CoMn_2O_4$ coating layer on the surface of the alloy, as shown in FIG. 28, the Cr concentration was restricted low for most part of the air electrode and Cr poisoning at the air electrode was practically non-problematic level. Then, the $CoMn_2O_4$ coating layer of EXAMPLE 18 has practically sufficient durability.

Example 19

In the SOFC cell, $(Zn_{0.45}Cu_{0.55})Co_2O_4$ coating layer was formed by the dipping method on the surface (both sides) of the alloy. Then, the resultant SOFC cell formed with this $(Zn_{0.45}Cu_{0.55})Co_2O_4$ coating layer was subjected to baking of the air electrode and then retained for 135 hours in 950° C. atmosphere which had been humidified to obtain humidity ranging from 10 to 20%. Thereafter, for this SOFC cell after this 135 hours of retention, the Cr distribution in the cross section adjacent the bonded portion between the alloy and the air electrode was analyzed by EPMA.

Figure 29:

FIG. 29 shows the result of analysis of the Cr distribution of the sintered SOFC cell after the durability evaluation test of EXAMPLE 19. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 µm.

As the results of these tests, in the SOFC cell according to EXAMPLE 19 having the $(Zn_{0.45}Cu_{0.55})Co_2O_4$ coating layer on the surface of the alloy, as shown in FIG. 29, the Cr concentration was restricted low for most part of the air electrode and Cr poisoning at the air electrode was practically non-problematic level. Then, the $(Zn_{0.45}Cu_{0.55})Co_2O_4$ coating layer of EXAMPLE 19 has practically sufficient durability.

Example 20

In the SOFC cell, $Mn(Mn_{0.25}Cu_{0.75})_2O_4$ coating layer was formed by the dipping method on the surface (one side) of the alloy. Then, the resultant SOFC cell formed with this $Mn(Mn_{0.25}Cu_{0.75})_2O_4$ coating layer was subjected to baking of the air electrode and then retained for 135 hours in 950° C. atmosphere which had been humidified to obtain humidity ranging from 10 to 20%. Thereafter, for this SOFC cell after this 135 hours of retention, the Cr distribution in the cross section adjacent the bonded portion between the alloy and the air electrode was analyzed by EPMA.

Figure 30:

FIG. 30 shows the result of analysis of the Cr distribution of the sintered SOFC cell after the durability evaluation test of EXAMPLE 20. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 µm.

As the results of these tests, in the SOFC cell according to EXAMPLE 20 having the $Mn(Mn_{0.25}Cu_{0.75})_2O_4$ coating layer on the surface of the alloy, as shown in FIG. 30, the Cr concentration was restricted low for most part of the air electrode and Cr poisoning at the air electrode was practically non-problematic level. Then, the $Mn(Mn_{0.25}Cu_{0.75})_2O_4$ coating layer of EXAMPLE 20 has practically sufficient durability.

Example 21

In the SOFC cell, $Co_3O_4$ coating layer was formed by the dipping method on the surface (one side) of the alloy. Then, the resultant SOFC cell formed with this $Co_3O_4$ coating layer was subjected to baking of the air electrode and then retained for 135 hours in 950° C. atmosphere which had been humidified to obtain humidity ranging from 10 to 20%. Thereafter, for this SOFC cell after this 135 hours of retention, the Cr distribution in the cross section adjacent the bonded portion between the alloy and the air electrode was analyzed by EPMA.

Figure 31:

FIG. 31 shows the result of analysis of the Cr distribution of the sintered SOFC cell after the durability evaluation test of EXAMPLE 21. Meanwhile, in this figure, the Cr concentration of the alloy was about 22% and the Cr concentration in the area of the lightest color tone in the air electrode was about 0% (the light gray area of the air electrode in the figure). And, in these figures showing distributions, the lateral width of the photographic view is about 130 µm.

As the results of these tests, in the SOFC cell according to EXAMPLE 21 having the $Co_3O_4$ coating layer on the surface of the alloy, as shown in FIG. 31, the Cr concentration was restricted low for most part of the air electrode and Cr poisoning at the air electrode was practically non-problematic level. Then, the $Co_3O_4$ coating layer of EXAMPLE 21 has practically sufficient durability.

The results of EXAMPLES 1-16 and COMPARISON EXAMPLE 1 are summarized in the table shown in FIG. 34.

Figure 37:
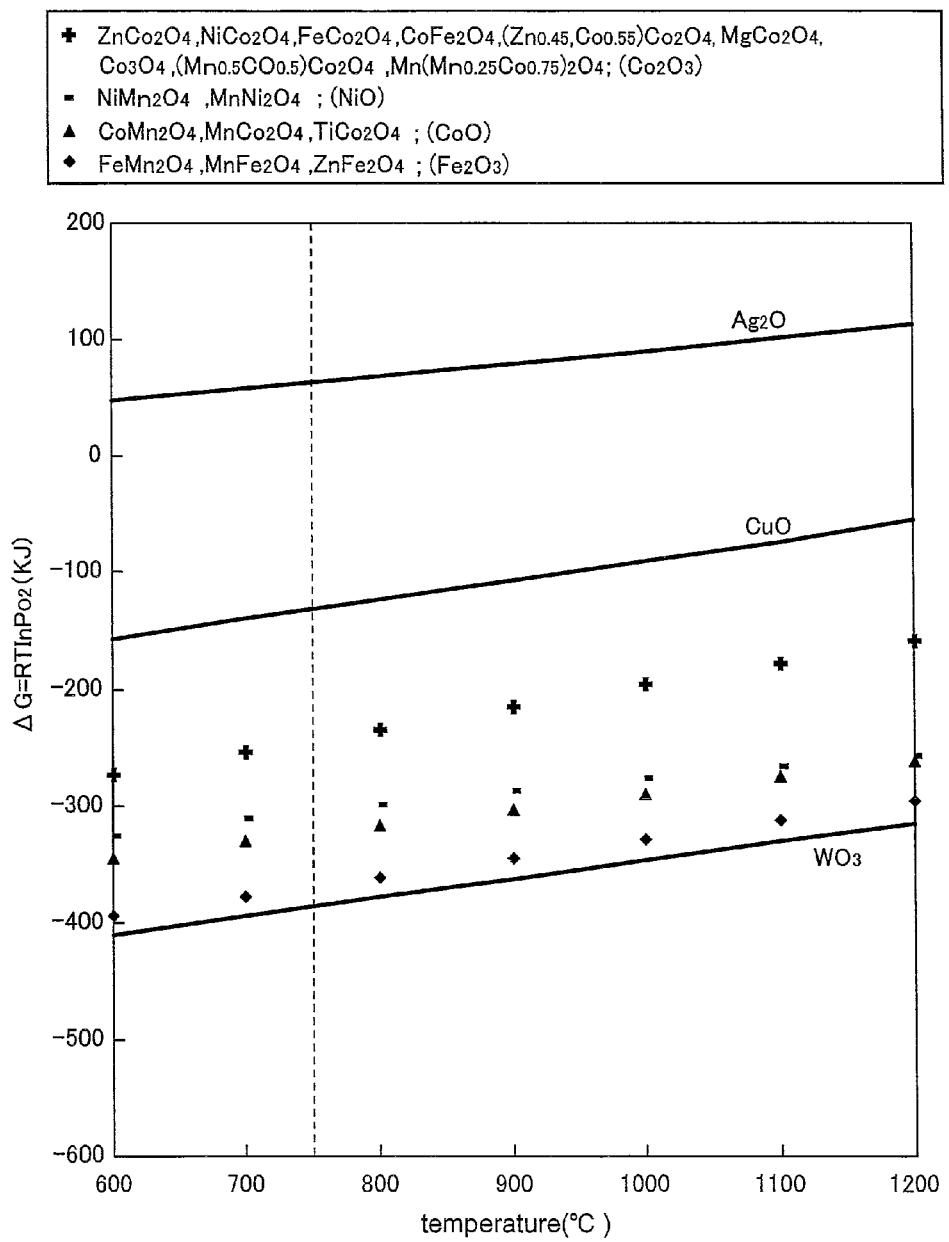

Further, FIG. 37 shows an Ellingham diagram showing relationship between temperatures and chemical potentials of oxygen generated by the metal oxides of the spinel oxides employed in EXAMPLES 1-16. In this FIG. 37, the horizontal axis represents the temperature whereas the vertical axis represents the Gibbs energy of the reaction per mol of oxygen. Meanwhile, the chemical potentials of the respective spinel oxides plotted in FIG. 37 do not represent the values of these respective spinel oxides per se, but the value of the first mono metal oxide having a higher equilibrium dissociated oxygen partial pressure of the first and second mono metal oxides together constituting the spinel oxide.

Figure 38:
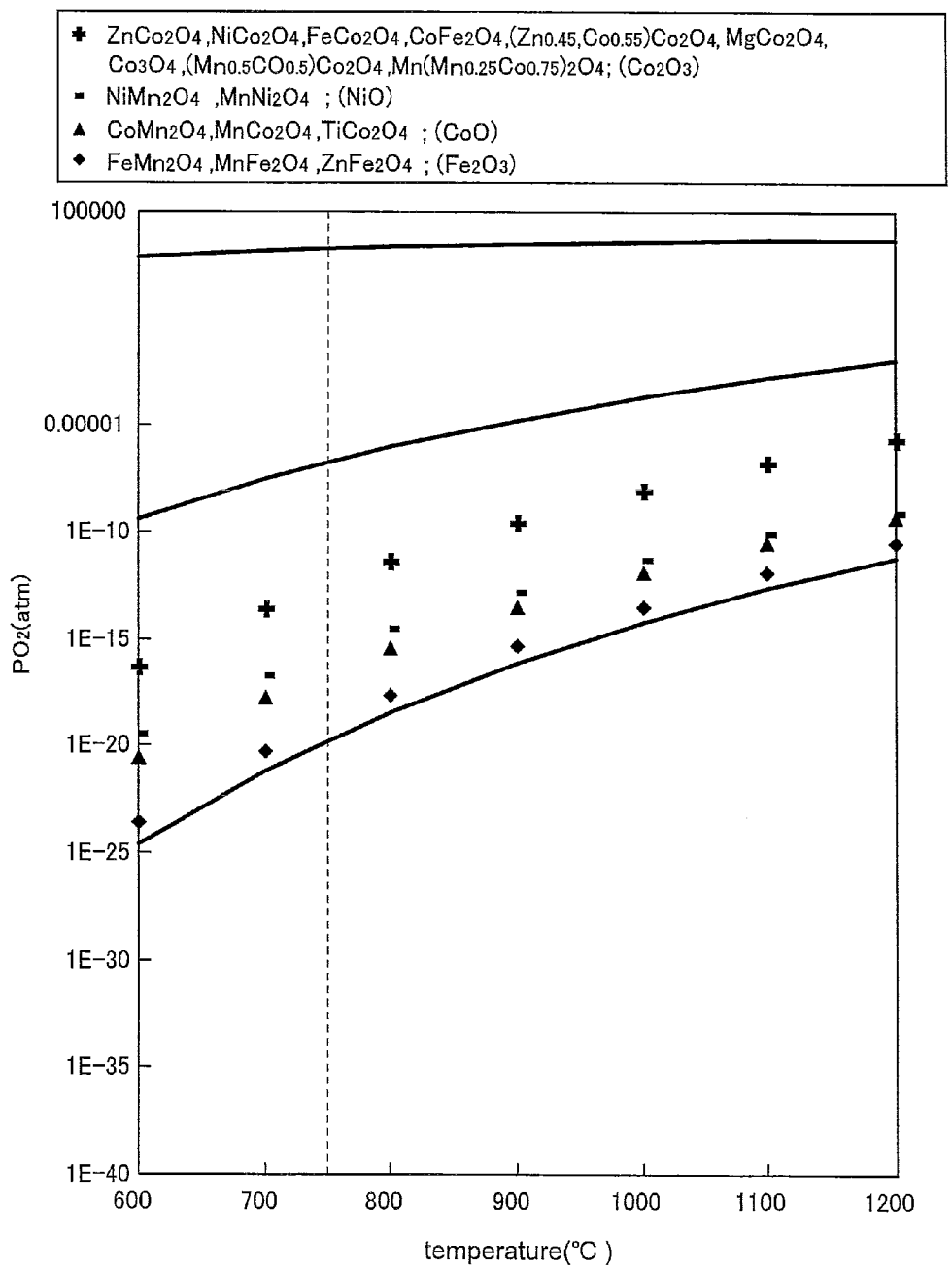

Further, FIG. 38 shows relationship between temperatures and the equilibrium dissociated oxygen partial pressures ($PO_2$) of the spinel oxides employed in EXAMPLES 1-16. In this FIG. 38, the horizontal axis represents the temperature whereas the vertical axis represents the equilibrium dissociated oxygen partial pressures ($PO_2$). Meanwhile, the equilibrium dissociated oxygen partial pressures ($PO_2$) plotted in FIG. 38 do not represent the values of these respective spinel oxides per se, but the value of the first mono metal oxide having a higher equilibrium dissociated oxygen partial pressure of the first and second mono metal oxides together constituting the spinel oxide. Further, the equilibrium dissociated oxygen partial pressure is a value obtained from standard free energy of formation of the oxide formed from such elemental substances as a metal and oxygen (that is, a value calculated from the Ellingham diagram).

Figure 32:
Figure 33:
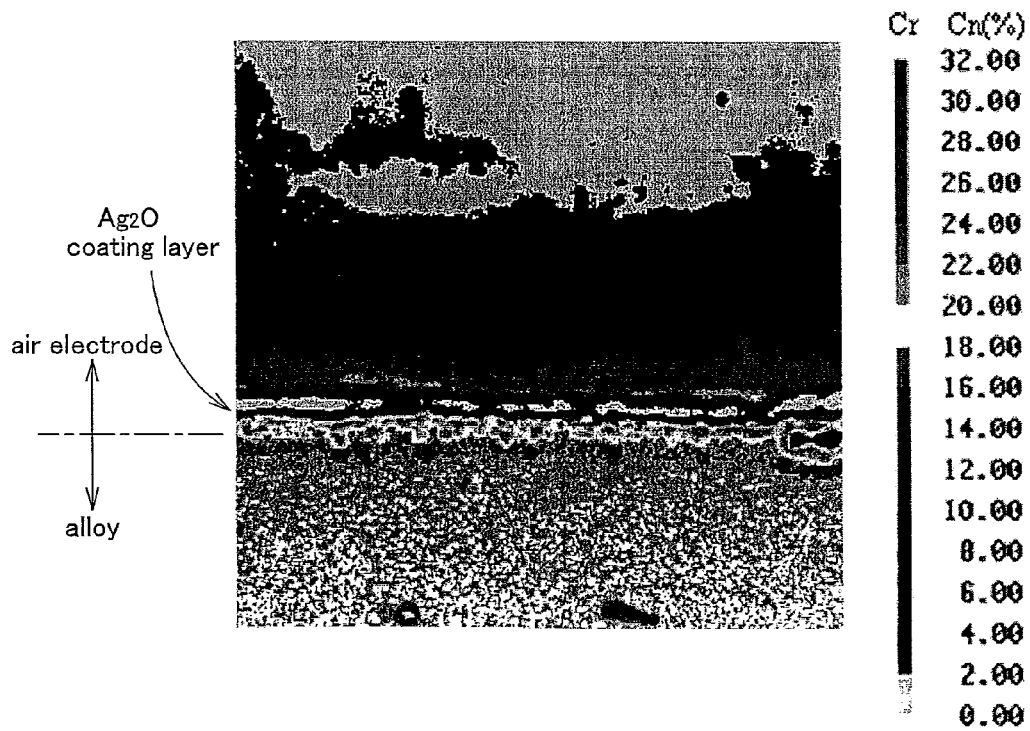

Further, for reference, FIG. 37 and FIG. 38 show also data relating to chemical potentials of the oxygen generated from metal oxides and equilibrium dissociated oxygen partial pressures of mono metal oxides ($Al_2O_3$, $Ag_2O$, and $WO_3$) which are not the spinel oxides described in the above-described embodiments. Further, FIG. 32 shows Cr distribution of sintered SOFC cell having formed on the surface of alloy or the like of (La, Sr) $CoO_3$ which is a lanthanum cobaltate material for an air electrode as a conventional coating layer as COMPARISON Example 2. Moreover, FIG. 33 shows the result of EPMA analysis of Cr distribution in the cross section adjacent the bonded portion between the alloy and the air electrode in COMPARISON EXAMPLE 3 wherein. $Ag_2O$ as another of the above-described mono metal oxides was formed by means of sputtering into a 0.8 µm layer on the surface of the alloy and then sintered with being bonded with material for the air electrode and then retained for 200 hours at 800° C.

From the above-described results, it has been shown that any "coating layer containing a spinel oxide comprised of a first mono metal oxide and a second mono metal oxide, said first mono metal oxide having an equilibrium dissociated oxygen partial pressure at 750° C. ranging from $1.83 \times 10^{-20}$ to $3.44\times10^{-12}$ atm., said second mono metal oxide having a lower equilibrium dissociated oxygen partial pressure at 750° C. than said first mono metal oxide" provides only practically entirely harmless level of Cr poisoning at the air electrode and is also capable of restricting oxidation deterioration due to Cr depletion in the alloy or the like constituting the interconnect 1. Here, the equilibrium dissociated oxygen partial pressure is defined as a value where the mono metal oxide is reduced to the metal. Further, the equilibrium dissociated oxygen partial pressure is a value obtained from standard free energy of formation of the oxide formed from such elemental substances as a metal and oxygen (that is, a value calculated from the Ellingham diagram). Further, regarding the voltage drop at 750° C., as compared with the alloy or the like of comparison examples having no coating layer formed, no significant voltage drops were observed; hence, it was confirmed that they have no problem in their performances as SOFC. Incidentally, in the above-described embodiments of the present invention, the spinel oxides employed in the SOFC cell of the invention were used individually. Instead of this, it is also possible to employ two or more kinds of spinel oxides in the form of mixture thereof.

On the other hand, regarding COMPARISON EXAMPLE 1 and the mono metal oxides, as may be apparent from FIG. 38, the results deviated from the scope of the present invention of "the equilibrium dissociated oxygen partial pressure ranging from $1.83\times10^{-20}$ to $3.44\times10^{-13}$". Here, the lower limit value ($1.83\times10^{-20}$ atm) is the equilibrium dissociated oxygen partial pressure at 750° C. of $WO_3$ which is cited as one example of the mono metal oxides. Further, the equilibrium dissociated oxygen partial pressure is a value obtained from standard free energy of formation of the oxide formed from such elemental substances as a metal and oxygen (that is, a value calculated from the Ellingham diagram).

In fact, when an effect confirming test like those done in the above-described EXAMPLES 14-16 was done with using the alloy sample of COMPARISON EXAMPLE 1, as shown in FIG. 4, Cr poisoning at the air electrode 31 was observed. And, it was also confirmed that the sample was unable to effectively restrict occurrence of oxidation deterioration due to Cr depletion in the alloy or the like constituting the interconnect 1.

Moreover, in the case of coating layer of the surface of the alloy or the like with mono metal oxides (e.g. $Ag_2O$ in FIG. 38) having equilibrium dissociated oxygen partial pressures outside the scope defined by the present invention (the equilibrium dissociated oxygen partial pressure ranging from $1.83\times10^{-20}$ to $3.44\times10^{-13}$), as shown in FIG. 33, Cr poisoning at the air electrode 31 was observed. And, it was also confirmed that it was not possible to effectively restrict occurrence of oxidation deterioration due to Cr depletion in the alloy or the like constituting the interconnect 1. Here, the equilibrium dissociated oxygen partial pressure is defined as a value where the mono metal oxide is reduced to the metal. Further, the equilibrium dissociated oxygen partial pressure is a value obtained from standard free energy of formation of the oxide formed from such elemental substances as a metal and oxygen (that is, a value calculated from the Ellingham diagram).

Further, as may be apparent from FIG. 32, regarding (La Sr) $CoO_3$ which is a conventional coating layer material, it was confirmed again that its effect of preventing Cr scattering from the alloy or the like is not sufficient.

INDUSTRIAL APPLICABILITY

The SOFC cell relating to the present invention can be advantageously used in an SOFC cell comprising a Cr-containing alloy or the like and an air electrode bonded together, as an SOFC cell capable of effectively restricting occurrence of Cr poisoning of the air electrode and capable also of effectively restricting occurrence of oxidation deterioration due to Cr depletion in the alloy or the like.

| Description of Reference Marks | |
|---|---|
| 1: | interconnect (alloy or oxide) |
| 1a: | boundary face |
| 2a: | air flow path |
| 2: | groove |
| 2b: | fuel flow path |
| 3: | unit cell |
| 30: | electrolyte layer |
| 31: | air electrode |
| 32: | fuel electrode |
| C: | SOFC cell (cell for solid oxide fuel cell) |

The invention claimed is:

1. A cell for a solid oxide fuel cell comprising a Cr-containing alloy or oxide and an air electrode bonded together; wherein on the surface of said alloy or oxide, there is formed a coating layer containing a spinel oxide comprised of a first mono metal oxide and a second mono metal oxide, said first mono metal oxide having an equilibrium dissociated oxygen partial pressure at 750° C. ranging from $1.83\times10^{-20}$ to $3.44\times10^{-13}$ atm. and said second mono metal oxide having a lower equilibrium dissociated oxygen partial pressure at 750° C. than said first mono metal oxide, and the spinel oxide is selected from the group consisting of $NiCo_2O_4$, $(Zn_xCO_{1-x})Co_2O_4$ ($0.45 \leq x \leq 1.00$), $TiCo_2O_4$, $MgCo_2O_4$, and a mixture of two or more thereof.

2. The cell for a solid oxide fuel cell according to claim 1, wherein said coating layer has a thickness ranging from 0.1 to 100 µm.

3. The cell for a solid oxide fuel cell according to claim 1, wherein said coating layer is prepared by sintering with addition of a sintering agent.

4. The cell for a solid oxide fuel cell according to claim 2, wherein said coating layer is prepared by sintering with addition of a sintering agent.

* * * * *